US012810582B2

(12) United States Patent
Churchill et al.

(10) Patent No.: US 12,810,582 B2
(45) Date of Patent: Nov. 24, 2026

(54) FAIRNESS IN VISUAL CLUSTERING: A NOVEL TRANSFORMER CLUSTERING APPROACH

(71) Applicant: BOARD OF TRUSTEES OF THE UNIVERSITY OF ARKANSAS, Little Rock, AR (US)

(72) Inventors: Hugh Churchill, Fayetteville, AR (US); Khoa Luu, Fayetteville, AR (US); Xuan Bac Nguyen, Fayetteville, AR (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 197 days.

(21) Appl. No.: 18/809,006

(22) Filed: Aug. 19, 2024

(65) Prior Publication Data

US 2025/0061688 A1 Feb. 20, 2025

Related U.S. Application Data

(60) Provisional application No. 63/533,187, filed on Aug. 17, 2023.

(51) Int. Cl.
*G06V 10/762* (2022.01)
*G06V 10/82* (2022.01)
(Continued)

(52) U.S. Cl.
CPC ............ *G06V 10/762* (2022.01); *G06V 10/82* (2022.01); *G06V 10/993* (2022.01); *G06V 40/161* (2022.01); *G06V 40/172* (2022.01)

(58) Field of Classification Search
CPC .... G06V 10/762; G06V 40/172; G06V 10/82; G06V 40/161; G06V 10/993
(Continued)

(56) References Cited

U.S. PATENT DOCUMENTS

| | | | |
|---|---|---|---|
| 7,587,069 | B2 | 9/2009 | Movellan et al. |
| 7,624,076 | B2 | 11/2009 | Movellan et al. |

(Continued)

FOREIGN PATENT DOCUMENTS

| | | | |
|---|---|---|---|
| EP | 3396591 | A2 | 10/2018 |
| EP | 3968239 | A1 | 3/2022 |
| EP | 4115321 | A1 | 1/2023 |

OTHER PUBLICATIONS

Zheng, Lecheng, Yada Zhu, and Jingrui He. "Fairness-aware multi-view clustering." Proceedings of the 2023 SIAM International Conference on Data Mining (SDM). Society for Industrial and Applied Mathematics, 2023. (Year: 2023).*

(Continued)

*Primary Examiner* — Jonathan S Lee
(74) *Attorney, Agent, or Firm* — Farhang Amini; Shackelford, Mckinley & Norton, LLP

(57) ABSTRACT

In some embodiments, the present disclosure pertains to systems and methods for evaluating demographic bias of images in a model having multiple clusters of images. In some embodiments, the method may include the steps of: determining demographic bias of the images in each of the multiple clusters of the model via a cluster purity evaluation module, encouraging a demographic fairness consistency for each of the multiple clusters via a loss function module to maintain fairness of the model, identifying, via a cross-attention module, correlations between each of the multiple clusters, and strengthening, via the cross-attention module, samples to have a stronger relationship with a centroid of each of the multiple clusters.

17 Claims, 17 Drawing Sheets

(51) Int. Cl.
*G06V 10/98* (2022.01)
*G06V 40/16* (2022.01)

(58) Field of Classification Search
USPC .......................................................... 382/225
See application file for complete search history.

(56) References Cited

U.S. PATENT DOCUMENTS

| | | | |
|---|---|---|---|
| 7,966,274 | B2 | 6/2011 | Adams et al. |
| 8,014,572 | B2 | 9/2011 | Xiao et al. |
| 8,214,311 | B2 | 7/2012 | Adams et al. |
| 8,694,459 | B2 | 4/2014 | Zadeh et al. |
| 8,873,813 | B2 | 10/2014 | Tadayon et al. |
| 9,665,927 | B2 | 5/2017 | Ji et al. |
| 9,916,538 | B2 | 3/2018 | Zadeh et al. |
| 10,108,850 | B1 | 10/2018 | Das et al. |
| 10,192,142 | B2 | 1/2019 | Wasfy et al. |
| 10,423,855 | B2 | 9/2019 | Cameron et al. |
| 10,496,697 | B2 | 12/2019 | Das et al. |
| 10,592,732 | B1 | 3/2020 | Sather et al. |
| 10,740,774 | B2 | 8/2020 | Sheppard et al. |
| 10,747,989 | B2 | 8/2020 | Zou et al. |
| 10,769,503 | B1 | 9/2020 | Buhler et al. |
| 10,810,452 | B2 | 10/2020 | Adams et al. |
| 10,936,868 | B2 | 3/2021 | Short et al. |
| 11,074,495 | B2 | 7/2021 | Zadeh et al. |
| 11,195,057 | B2 | 12/2021 | Zadeh et al. |
| 11,222,233 | B2 | 1/2022 | Savchenko et al. |
| 11,487,811 | B2 | 11/2022 | Das et al. |
| 11,507,677 | B2 | 11/2022 | Li et al. |
| 11,594,006 | B2 | 2/2023 | Yang et al. |
| 11,620,476 | B2 | 4/2023 | Luo et al. |
| 2004/0002930 | A1 | 1/2004 | Oliver et al. |
| 2009/0144212 | A1 | 6/2009 | Adams et al. |
| 2011/0251981 | A1 | 10/2011 | Adams |
| 2013/0330008 | A1 | 12/2013 | Zadeh et al. |
| 2014/0079297 | A1 | 3/2014 | Tadayon et al. |
| 2014/0201126 | A1 | 7/2014 | Zadeh et al. |
| 2016/0350649 | A1 | 12/2016 | Zhang et al. |
| 2016/0358314 | A1 | 12/2016 | Ji et al. |
| 2017/0011257 | A1 | 1/2017 | Mikhael et al. |
| 2017/0017975 | A1 | 1/2017 | Sheppard et al. |
| 2017/0323168 | A1 | 11/2017 | Adams et al. |
| 2018/0204111 | A1 | 7/2018 | Zadeh et al. |
| 2018/0260974 | A1 | 9/2018 | Cameron et al. |
| 2018/0307899 | A1 | 10/2018 | Das et al. |
| 2019/0057356 | A1 | 2/2019 | Larsen et al. |
| 2019/0095703 | A1 | 3/2019 | Das et al. |
| 2019/0286980 | A1 | 9/2019 | Backhus et al. |
| 2020/0065563 | A1 | 2/2020 | Zou et al. |
| 2020/0097762 | A1 | 3/2020 | Savchenko et al. |
| 2020/0184278 | A1 | 6/2020 | Zadeh et al. |
| 2020/0210472 | A1 | 7/2020 | Das et al. |
| 2020/0265153 | A1 | 8/2020 | Li et al. |
| 2020/0302169 | A1 | 9/2020 | Short et al. |
| 2020/0372277 | A1 | 11/2020 | Adams et al. |
| 2021/0064931 | A1 | 3/2021 | Yang et al. |
| 2021/0287147 | A1 | 9/2021 | Mimassi et al. |
| 2021/0342615 | A1 | 11/2021 | Adams et al. |
| 2021/0390411 | A1 | 12/2021 | Carvalho et al. |
| 2022/0019827 | A1 | 1/2022 | Adams |
| 2022/0101062 | A1 | 3/2022 | Fischer et al. |
| 2023/0066050 | A1 | 3/2023 | Li et al. |

OTHER PUBLICATIONS

Nguyen, Xuan-Bac, et al. "Clusformer: A transformer based clustering approach to unsupervised large-scale face and visual landmark recognition." Proceedings of the IEEE/CVF conference on computer vision and pattern recognition. 2021. (Year: 2021).*

Nguyen, Xuan-Bac, et al. "Fairness in visual clustering: A novel transformer clustering approach." arXiv preprint arXiv:2304.07408 (2023). (Year: 2023).*

Shen et al., Structure-Aware Face Clustering on a Large-Scale Graph with 107 Nodes, Mar. 24, 2021, arXiv:2103.13225, https://doi.org/10.48550/arXiv.2103.13.

* cited by examiner (C2) BUPT-GlobalFace (2.2M)

FAIRNESS IN VISUAL CLUSTERING: A NOVEL TRANSFORMER CLUSTERING APPROACH

CROSS-REFERENCE TO RELATED APPLICATIONS

This application claims priority to U.S. Provisional Patent Application No. 63/533,187, filed on Aug. 17, 2023. The entirety of the aforementioned application is incorporated herein by reference.

BACKGROUND

The present disclosure relates generally to fairness in visual clustering, and more particularly, and not by way of limitation, a novel transformer clustering approach for visual clustering.

SUMMARY

In an embodiment, the present disclosure pertains to a method for evaluating demographic bias of images in a model having multiple clusters of images. In some embodiments, the method may include the steps of: determining demographic bias of the images in each of the multiple clusters of the model via a cluster purity evaluation module, encouraging a demographic fairness consistency for each of the multiple clusters via a loss function module to maintain fairness of the model, identifying, via a cross-attention module, correlations between each of the multiple clusters, and strengthening, via the cross-attention module, samples to have a stronger relationship with a centroid of each of the multiple clusters.

In a further embodiment, the present disclosure pertains to a system having a processor coupled to a memory. In some embodiments, the processor is operable to implement a method including the steps of: determining demographic bias of the images in each of the multiple clusters of the model via a cluster purity evaluation module, encouraging a demographic fairness consistency for each of the multiple clusters via a loss function module to maintain fairness of the model, identifying, via a cross-attention module, correlations between each of the multiple clusters, and strengthening, via the cross-attention module, samples to have a stronger relationship with a centroid of each of the multiple clusters.

In an additional embodiment, the present disclosure pertains to a computer-program product having a non-transitory computer-usable medium having computer-readable program code embodied therein. In some embodiments, the computer-readable program code is adapted to be executed to implement a method including the steps of: determining demographic bias of the images in each of the multiple clusters of the model via a cluster purity evaluation module, encouraging a demographic fairness consistency for each of the multiple clusters via a loss function module to maintain fairness of the model, identifying, via a cross-attention module, correlations between each of the multiple clusters, and strengthening, via the cross-attention module, samples to have a stronger relationship with a centroid of each of the multiple clusters.

BRIEF DESCRIPTION OF THE DRAWINGS

A better understanding of the present invention can be obtained when the following detailed description is considered in conjunction with the following drawings, in which.

DETAILED DESCRIPTION

Figure 1:
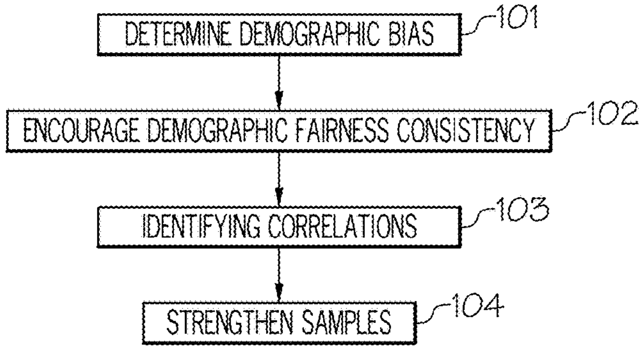
FIG. 1 provides an illustration of a method for evaluating demographic bias of images (e.g., photographic images) in a model (e.g., a deep clustering model).

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that include more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Unsupervised learning in automated objects and human understanding has recently become one of the most popular research topics. This is because of the nature of the extensive collection of available raw data without labels and the demand for consistent visual recognition algorithms across various challenging conditions. Standard visual recognition (e.g., face recognition or visual landmark recognition), has recently achieved high-performance accuracy in numerous practical applications where probe and gallery visual photos are collected in different environments. Together with accuracy, algorithmic fairness has recently received broad attention from research communities as it may bring an enormous impact on applications deployed in practice. For example, a face recognition system giving very impressive accuracy on white faces while having a very high false positive rate on non-white faces could result in unfair treatment of individuals across different demographic groups. Therefore, by defining a sensitive (protected) attribute (such as gender, ethnicity, or age), a fair and accurate recognition system is particularly desirable.

In most recent studies of deep clustering, clustering functions are often Graph Convolution Neural Networks (GCN) or Transformer-based Networks. Both approaches share the same goal: determine which samples in a cluster are different from the centroid and remove them from the cluster. In GCN-based methods, each cluster is treated as a graph where each vertex represents a sample, and an edge connecting two vertices illustrates how strong the connection between them is. The GCN method aims to explore the correlation of a vertex with its neighbors. Recent studies presented a method to estimate confidence (GCN-V) of a vertex being a true positive sample or outlier of a given cluster. In addition, GCN-E is also introduced to predict if two vertexes belong to the same class (or cluster).

However, in minor clusters where purity is low and connections between vertices are weak, the network becomes ineffective. Other GCN-based approaches also face the same issue. Transformer has been applied to many tasks in Natural Language Processing (NLP) and computer vision. A recent study introduced a new Transformer based architecture for visual clustering. This method treats a cluster as a sequence starting with a cluster's centroid and followed by its neighbors with decreasing order of similarities. Then, Clusformer predicts which vertex is the same class as the centroid.

Another study utilized a leverage transformer-based approach as the feature encoder for face clustering. Fairness has garnered much attention in recent computer vision and deep learning research. The most common objective is to improve fairness by lowering the model's accuracy disparity between images from various demographic sub-groups. Facial recognition is one of the most common topics, attracting numerous researchers. There are notable datasets for fair face recognition such as the Diversity in Faces (DiF) dataset, Racial Faces in-the-Wild (RFW), BUPT-GlobalFace, and BUPT-BalancedFace.

Fairness in the visual clustering problem has also been addressed. A recent study proposed a deep fair clustering method to hide sensitive attributes. Another study on fairness regarding unsupervised outlier detection proposed a Deep Clustering based Fair Outlier Detection framework (DCFOD) to simultaneously detect the validity and group fairness. Experiments were conducted on the relatively small MNIST database. However, there has been no prior large-scale face clustering work with the fairness criteria.

Thus, a need exists for a method to make facial grouping in computer vision fairer. As such, the disclosure addresses concerns regarding unfair treatment that arises in different demographic groups in facial clustering algorithms used in computer vision systems.

Unlike a few concurrent research on the fairness of computer vision, this disclosure studies how to address the unfair facial clustering problem. The disclosure introduces cluster purity as an indicator of demographic bias. Secondly, this disclosure proposes a novel loss to enforce the consistency of purity between clusters of different groups; thus, fairness can be achieved. Finally, a novel framework for visual clustering is presented to strengthen the hard clusters, which usually come from the minor/biased group. This framework contributes not only to fairness but also to clustering performance overall.

Method for Evaluating Demographic Bias

In some embodiments, the present disclosure pertains to a method for evaluating demographic bias of images in a model. FIG. 1 illustrates an example method for evaluating demographic bias according to aspects of the present disclosure. In some embodiments, the model may have multiple clusters of images. In some embodiments, the images may include, for example, photographic images.

As illustrated in FIG. 1, in some embodiments, the method includes, for example, determining demographic bias of the images in each of the multiple clusters of the model via a cluster purity evaluation module (101). The methods of the present disclosure may also include encouraging a demographic fairness consistency for each of the multiple clusters via a loss function module to maintain fairness of the model (102). In some embodiments, the methods herein further include a step of identifying, via a cross-attention module, correlations between each of the multiple clusters (103), and strengthening, via the cross-attention module, samples to have a stronger relationship with a centroid of each of the multiple clusters (104).

In some embodiments, the determining may include calculating the ratio of positive samples within each of the multiple clusters to their correlation degree. In some embodiments, the method further includes using the calculation as an indication of the demographic bias in the model. In some embodiments, the determined demographic may include, without limitation, biases based, at least in part, on gender, ethnicity, race, age, or combinations of the same and like.

In some embodiments, the images include facial images of a plurality of subjects. In some embodiments, the images may include unlabeled images. In some embodiments, the images may include unlabeled photographic images. In some embodiments, the model may include, for example, a deep clustering model having multiple clusters of images. In some embodiments, the model may include, for example, a k-means clustering model, a gaussian mixture model, a hierarchical model, a density-based spatial cluster model, a spectral clustering model, self-organizing maps, t-distributed stochastic neighbor models, and combinations of the same and like.

In some embodiments, the loss function module may include, without limitation, a Fowlkes-Mallows-based index. In some embodiments, the step of encouraging demographic fairness may include, for example, improving purity, via the loss function module, of the multiple clusters. In some embodiments, the purity may include an indicator of demographic bias between clusters of different groups.

While the present disclosure focuses on a Fowlkes-Mallows index to evaluate the quality of clustering, alternative evaluation metrics and/or loss functions techniques may include, without limitation, silhouette scores, Davies-Bouldin indexes, adjusted Rand indexes, mutual information techniques, normalized mutual information techniques, V-measure techniques, cluster purity methods, confusion matrix-based metrics, Calinski-Harabasz indexes, Dunn indexes, and combinations of the same and like.

System for Evaluating Demographic Bias

Additional embodiments of the present disclosure pertain to a system for evaluating demographic bias of images in a model. In some embodiments, the model may be a deep clustering model. In some embodiments, the model includes multiple clusters of images (e.g., photographic images). In some embodiments, the system includes a processor coupled to a memory. In some embodiments, the processor is operable to implement a method as outlined in detail above.

In some embodiments, the system includes a computing device. In some embodiments, the computing device includes one or more computer readable storage mediums having at least one program code embodied therewith and may be operable to implement the methods as described herein. In some embodiments, the program code of the system includes programming instructions for determining demographic bias of the images in each of the multiple clusters of the model via a cluster purity evaluation module. In some embodiments, the program code of the system includes programming instructions for encouraging a demographic fairness consistency for each of the multiple clusters via a loss function module to maintain fairness of the model.

In some embodiments, the program code of the system includes programming instructions for identifying, via a cross-attention module, correlations between each of the multiple clusters and strengthening, via the cross-attention module, samples to have a stronger relationship with a centroid of each of the multiple clusters.

In some embodiments, the system of the present disclosure also includes the cluster purity evaluation module. In some embodiments, the system of the present disclosure also includes the loss function module. In some embodiments, the system of the present disclosure also includes the cross-attention module. In some embodiments, each module may be separate or combined into a single module.

Computer-Program Product

Additionally and/or alternatively, in some embodiments, the present disclosure relates to a computer-program product having a non-transitory computer-usable medium having computer-readable program code embodied therein. In some embodiments, the computer-readable program code is adapted to be executed to implement the methods as disclosed above.

Applications and Advantages

In some embodiments, the present disclosure can provide systems and methods for improved fairness. In some embodiment, by addressing demographic biases in facial clustering, the systems and methods promote fairness and equal treatment of different groups in computer vision systems. In some embodiments, the systems and methods provide enhanced clustering performance. For example, the novel framework not only ensures fairness but also contributes to better overall performance in clustering tasks.

In some embodiments, the systems and methods of the disclosure provide better decision-making using fair and unbiased computer vision systems that lead to more accurate and informed decisions in various applications, such as security, marketing, and hiring. Additionally, in some embodiments, the systems and methods provided herein allow for ethical artificial intelligence development by addressing fairness concerns in aspects of artificial intelligence technology.

The systems and methods of the present disclosure may be utilized for surveillance and security to enhance the fairness of facial recognition systems used in public spaces, airports, and other security-sensitive locations to reduce biased outcomes. Additionally, the systems and methods may be utilized in social media to improve the grouping and tagging of users' images and videos by ensuring fairness in clustering algorithms, leading to better content organization and recommendations. Alternatively, the systems and methods may be used for hiring and recruitment to ensure unbiased analysis of job applicants' photos and videos during automated screening processes, thus promoting equal opportunities for candidates from different backgrounds. Other applications are readily envisioned in, for example: (1) marketing and advertising for analyzing customer demographics fairly for targeted marketing campaigns, ensuring better representation of various groups in ads and promotional materials; (2) healthcare and medical imaging to improve accuracy and fairness of computer vision algorithms used to analyze medical images by reducing potential biases in identifying patterns across diverse patient populations; (3) law enforcement for enhancing the fairness of facial recognition systems used by police and other law enforcement agencies, helping to prevent wrongful identifications or unjust targeting of specific demographic groups; (4) entertainment and media to ensuring fair representation of diverse actors and models in casting processes by using unbiased computer vision systems to analyze auditions and portfolios; and (5) smart city applications for creating unbiased artificial intelligence-driven services for city dwellers by using fair facial clustering algorithms in traffic management, public transportation, and other smart city initiatives.

Additional Embodiments

Reference will now be made to more specific embodiments of the present disclosure and experimental results that provide support for such embodiments. However, Applicant notes that the disclosure below is for illustrative purposes only and is not intended to limit the scope of the claimed subject matter in any way.

Example 1. Fairness in Visual Clustering: A Novel Transformer Clustering Approach Promoting fairness for deep clustering models in unsupervised clustering settings to reduce demographic bias is a challenging goal. This is because of the limitation of large-scale balanced data with well-annotated labels for sensitive or protected attributes. In this Example, Applicants first evaluate demographic bias in deep clustering models from the perspective of cluster purity, which is measured by the ratio of positive samples within a cluster to their correlation degree. This measurement is adopted as an indication of demographic bias. Then, a novel loss function is introduced to encourage a purity consistency for all clusters to maintain the fairness aspect of the learned clustering model. Moreover, Applicants present a novel attention mechanism, Cross-attention, to measure correlations between multiple clusters, strengthening faraway positive samples and improving the purity of clusters during the learning process. Experimental results on a large-scale dataset with numerous attribute settings have demonstrated the effectiveness of the proposed approach on both clustering accuracy and fairness enhancement on several sensitive attributes.

Example 1.1 Introduction

Unsupervised learning in automated objects and human understanding has recently become one of the most popular research topics. This is because of the nature of the extensive collection of available raw data without labels and the demand for consistent visual recognition algorithms across various challenging conditions. Standard visual recognition, e.g. Face Recognition or Visual Landmark Recognition, has recently achieved high-performance accuracy in numerous practical applications where probe and gallery visual photos are collected in different environments.

Together with accuracy, algorithmic fairness has recently received broad attention from research communities as it may bring an enormous impact on applications deployed in practice. For example, a face recognition system giving very impressive accuracy on white faces while having a very high false positive rate on non-white faces could result in unfair treatment of individuals across different demographic groups. Therefore, by defining a sensitive (protected) attribute (such as gender, ethnicity, or age), a fair and accurate recognition system is particularly desirable.

To alleviate the demographic bias for better fairness, many efforts have been directed toward deep learning approaches to extract less biased representations. A straightforward approach is to collect balanced datasets with respect to the sensitive attributes and use them for the training process. However, this approach requires extreme efforts to collect relatively balanced samples as well as annotations for sensitive attributes. Otherwise, an insufficient number of training samples may also lead to reducing the accuracy of learned models. Interestingly, approaches relying on balanced training data still suffer from demographic bias to some degree. Another approach is to focus on algorithmic designs such as Fairness-Adversarial Loss, maximizing the conditional mutual information (CMI) between inputs and cluster assignment given sensitive attributes, Domain Adaptation, or deep information maximization adaptation network by transferring recognition knowledge from one demographic group to other groups. Although these introduced methods have shown their advantages in reducing demographic bias without requirements of balanced data, they still lack generalization capability (i.e. learn for a particular sensitive attribute). Moreover, they also rely on accurate annotations for that sensitive attribute during learning.

In this Examples, one of the goals focuses on promoting fairness for deep clustering models in unsupervised clustering settings. Motivated by the fact that clusters of major demographic groups with many samples consist of only a few negative samples and that their correlations are very strong while those of minor demographic groups usually contain a large number of noisy or negative samples with weak correlations among positive ones, the cluster purity, i.e. ratio of the number of positive samples within a cluster to their correlations, plays an important role to measure clustering bias across demographic groups. Therefore, Applicants first evaluate the bias in deep clustering models from the perspective of cluster purity. Then, by encouraging consistency of the purity aspect for all clusters, demographic bias can be effectively mitigated in the learned clustering model. In the scope of this Example, Applicants further assume that the annotations for sensitive attributes are inaccessible due to their expensive collecting efforts and/or privacy concerns on annotating them.

Figure 2:
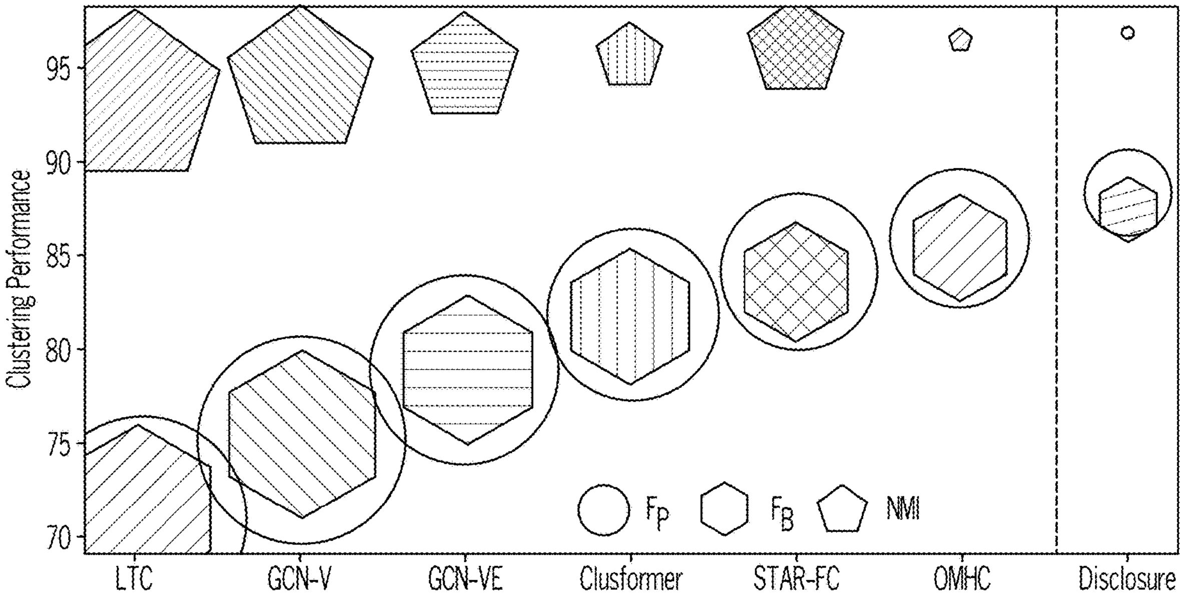
FIG. 2 illustrates clustering performance of BUPT-BalancedFace on ethnicity. Each shape area is proportional to standard deviation of performance on different groups of the race, i.e., Asian, African, Caucasian, and Indian. The smaller the shape the better the fairness method is. The method of the disclosure achieves both clustering accuracy and fairness on all metrics ($F_P$, $F_B$, and NMI).

Contributions. In summary, the contributions are fourfold. (1) The cluster purity and correlation between positive samples are first analyzed and adopted as an indication of a demographic bias for a visual clustering approach. (2) By promoting the purity similarity across clusters, the visual clustering fairness is effectively achieved without requirements of sensitive attributes' annotations. This property is formed into a novel loss function to improve fairness with respect to various kinds of sensitive attributes. (3) In terms of deep network design, Applicants present a novel attention mechanism, termed Cross-attention, to measure correlations between multiple clusters and help faraway samples have a stronger relationship with the centroid. (4) Finally, by comprehensive experiments, the proposed approach consistently achieves State-of-the-Art (SOTA) results compared to recent clustering methods on a standard large-scale visual benchmark across various demographic attributes, i.e., ethnicity, age, gender, race as shown in the FIG. 2.

Example 1.2 Related Work

Deep Clustering. In most recent studies of deep clustering, clustering functions are often Graph Convolution Neural Networks (GCN) or Transformer-based Networks. Both approaches share the same goal: determine which samples in a cluster are different from the centroid and remove them from the cluster.

In GCN-based methods, each cluster is treated as a graph where each vertex represents a sample, and an edge connecting two vertices illustrates how strong the connection between them is. The GCN method aims to explore the correlation of a vertex with its neighbors. A method to estimate confidence (GCN-V) of a vertex being a true positive sample or outlier of a given cluster has been previously presented. In addition, GCN-E is also introduced to predict if two vertexes belong to the same class (or cluster). However, in minor clusters where purity is low and connections between vertices are weak, the network becomes ineffective. Other GCN-based approaches also face the same issue. Transformer has been applied to many tasks in Natural Language Processing (NLP) and computer vision. Others introduced a new Transformer based architecture for visual clustering. This method treats a cluster as a sequence starting with a cluster's centroid and followed by its neighbors with decreasing order of similarities. Then, Clusformer predicts which vertex is the same class as the centroid. Some have leveraged transformer-based approaches as the feature encoder for face clustering.

Fairness in Computer Vision. Fairness has garnered much attention in recent computer vision and deep learning research. The most common objective is to improve fairness by lowering the model's accuracy disparity between images from various demographic sub-groups. Facial recognition is one of the most common topics, attracting numerous researchers. There are notable datasets for fair face recognition such as the Diversity in Faces (DiF) dataset, Racial Faces in-the-Wild (RFW), BUPT-GlobalFace, BUPT-BalancedFace. Fairness in the visual clustering problem is also addressed. Researchers have proposed a deep fair clustering method to hide sensitive attributes. Others focused on fairness regarding unsupervised outlier detection and proposed a Deep Clustering based Fair Outlier Detection framework (DCFOD) to simultaneously detect the validity and group fairness. Experiments were conducted on the relatively small MNIST database.

These prior works were not designed to be robust and scalable. Training these models is expensive as they require demographic attributes costly to annotate. In addition, these clustering approaches are not practical when dealing with unseen/unknown subjects as these methods require defining the number of clusters prior.

This Example is the first work dealing with large-scale clustering with the fairness criteria without involving demographic attributes during training

Example 1.3 Problem Formulation

Let D be a set of N data points to be clustered. Applicants define $H:D \rightarrow X \subset R^{N \times d}$ as a function that embeds these data points to a latent space X of d dimensions. Let $\hat{Y}$ be a set of ground-truth cluster IDs assigned to the corresponding data points. Since $\hat{Y}$ has a maximum of N different cluster IDs, one can represent Y as a vector of $[0, N-1]^N$. A deep clustering algorithm $\Phi: X \rightarrow Y \in [0, N-1]^N$ is defined as a mapping that maximizes a clustering metric $\sigma(Y, \hat{Y})$. As $\hat{Y}$ is not accessible during the training stage, the number of clusters and the number of samples per cluster are not given beforehand. Therefore, divide and conquer philosophy can be adopted to relax the problem. In particular, a deep clustering algorithm $\Phi$ can be divided into three subfunctions: pre-processing K, in-processing M, and post-processing P functions. Formally, $\Phi$ can be presented as in Eqn. (1).

$$\Phi(X) = \{M \circ K(x_i, n)\}_{x_i \in X} \qquad \text{Eqn. (1)}$$

where K denotes an unsupervised clustering algorithm on deep features $x_i$ of the i-th sample. k-NN is usually a common choice for K. In addition, for the post-processing P function, it is usually a rule-based algorithm to merge two or more clusters into one when they share high concavities. Since P does not depend on the input data points nor is a learnable function, the parameters $\theta_M$ of $\Phi$ can be optimized via this objective function:

$$\theta_M^* = \arg \min_{\theta_M} E_{x_i \sim p(X)}[L(M \circ K(x_i, n), \hat{q}_\iota)] \qquad \text{Eqn. (2)}$$

where k is the number of the nearest neighbors of input $x_i$, $\hat{q}_\iota$ is the objective of M to be optimized, and L denotes a suitable clustering or classification loss.

Additionally, let $G=\{g_1, g_2, \ldots g_p\}$ be a set of sensitive attributes (i.e., race, gender, age). Applicants further seek predictions for $\Phi$ to be accurate and fair to G. In other words, fairness criteria require Y not be biased in favor of one attribute or another, i.e., $P(Y|G=g_1)=P(Y|G=g_2)= \ldots P(Y|G=g_p)$. To achieve this goal, Applicants define $\mu_i=E_{x_i \sim p(g_i)}[L^{fair}(M \cdot K(x_i, n), \hat{q}_\iota)$ as the expected value of loss function $L^{fair}$ from data points belong to a group with the sensitive attribute $g_i$, where $L^{fair}$ is a suitable fairness loss. Then, the fairness discrepancy between groups can be defined as in Eqn. (3).

$$\Delta_{DP}(\Phi) = \frac{1}{2}\left(\sum_{i=1}^{p}\sum_{j=1}^{p}|\mu_i - \mu_j|\right) \qquad \text{Eqn. (3)}$$

In order to produce a fair prediction across sensitive attributes, $\Delta_{DP}(\Phi)$ should be minimized during the learning process. Therefore, from Eqn. (2) and Eqn. (3), the objective function with fairness factor can be reformulated as:

$$\theta_M^* = \arg \min_{\theta_M} E_{x_i \sim p(X)}[L(M \circ K(x_i, n), \hat{q}_\iota) + \lambda \Delta_{DP}(\Phi) \qquad \text{Eqn. (4)}$$

-continued $$= \arg \min_{\theta_M} E_{x_i \sim p(X)}\left[L(M \circ K(x_i, n), \hat{q}_\iota) + \frac{\lambda}{2}\left(\sum_{i=1}^{p}\sum_{j=1}^{p}|\mu_i - \mu_j|\right)\right]$$

Theoretical Analysis. From the definition of $\mu_i$, since $L^{fair}(M \cdot K(x_i, n), \hat{q}_\iota)$ is a loss function (i.e., Binary-cross entropy), the expectation of this function is greater than 0.

$$Lemm1 |\mu_i - \mu_j| \leq \mu_i + \mu_j \qquad \forall\, \mu_i, \mu_J \geq 0 \qquad \text{Eqn. (5)}$$

$$\text{Proof} \rightarrow \text{Let } \mu_i, \mu_J \geq 0, \text{ then}$$

$$0 \leq |\mu_i - \mu_j| \leq \mu_i + \mu_j$$

$$\Leftrightarrow (\mu_i - \mu_j)^2 \leq (\mu_i + \mu_j)^2$$

$$\Leftrightarrow \mu_i^2 - 2\mu_i\mu_j + \mu_j^2 \leq \mu_i^2 + 2\mu_i\mu_j + \mu_j^2$$

$$\Leftrightarrow -\mu_i\mu_j \leq \mu_i\mu_j$$

Applying the Lemma 1 to Eqn. (4), a new fairness objective function can be derived as, $$\theta_M^* \leq \arg \min_{\theta_M} E_{x_i \sim p(X)}[L(M \circ K(x_i, n), \hat{q}_\iota)] + \lambda \sum_{i=1}^{p} \mu_i \qquad \text{Eqn. (6)}$$

$$\leq \arg \min_{\theta_M} \underbrace{E_{x_i \sim p(X)}[L(M \circ K(x_i, n), \hat{q}_\iota)]}_{O1:\ \text{Maximize clustering performance}} + \lambda \underbrace{\sum_{i=1}^{p} E_{x_i \sim p(g_i)}[L(M \circ K(x_i, n), \hat{q}_\iota)]}_{O2:\ \text{Maximize fairness}}$$

In practice, each sensitive distribution $p(g_i)$ is unknown, expensive to measure, or even shifts over time. Moreover, some sensitive attributes have large and dominant samples, while the minor groups have few samples. Thus, optimizing the second objective (O2) and maintaining fairness in clustering remains challenging. The biases in clustering and their relationships to cluster purity is discussed further below.

Bias in Clustering and Its Effects. Since training data points D for a clustering approach are collected in some limited environments and constraints, the distributions of sensitive attributes are usually imbalanced. This data type often leads to a subsequent unfairness of every learning stage and the overall system. Let $D_{major}$ and $D_{minor}$ represent the samples in the major and minor attributes, respectively. Because $|D_{major}| >> |D_{minor}|$, a feature extractor H trained on D tends to generate more discriminative features for $D_{major}$ than $D_{minor}$.

Bias in Cluster Purity. A domino effect from D to H also leads to another bias on the predicted clusters, namely cluster purity. Particularly, latent features $x_i \in X$ are employed to K to construct predicted clusters denoted as $N(x_i)=M \cdot K(x_i, n)$. As latent features of samples with sensitive attributes belonging to $D_{major}$ are discriminative, their correlations are quite strong. Therefore, their constructed cluster has many positive samples, making its purity very high. Meanwhile, weak connections between samples of $D_{minor}$ may reflect in many noisy samples within a cluster, causing very low-quality clusters. Let the cluster purity be the ratio of the number of true positive samples within a predicted cluster:

$$\gamma_i(x_i) = \frac{|N^+(x_i)|}{n - n^-} \quad \text{Eqn. (7)}$$

where $N^+(x_i)=\{\{x_i\}|x_j \in N(x_i) \wedge y_j = y_i$ denotes the true positive set in the predicted cluster $N(x_i)$, and $n^-$ is the number of predicted negative samples. $y_i$, $y_j \in Y$ are the corresponding cluster IDs. Noted that the cluster purity $\gamma_i(x_i)$ not only provides the rate of correctly predicted samples but also indicates the rate of positive samples that cannot be identified by Φ. Due to the bias, $$\frac{1}{|D_{major}|}\sum_{x_i}^{X_{major}} \gamma_i(x_i) >> \frac{1}{|D_{minor}|}\sum_{x_i}^{X_{minor}} \gamma_i(x_i).$$

In general, directly mitigating this kind of bias via a "perfect balanced training dataset" is infeasible due to (1) a considerable effort to collect millions of images and their annotations for sensitive attributes; and (2) numerous enumerations of various sensitive attributes such as race, age, gender. Therefore, rather than focusing on constructing a balanced training dataset for different sensitive attributes, Applicants proposed a penalty loss to promote the purity consistency of all clusters across demographic groups. In this way, the rate of correctly predicted positive samples, as well as the missing positive samples, can be maintained to be similar among all clusters in both $D_{minor}$ and $D_{major}$, and, therefore, enhance the fairness in model's predictions. In addition, Applicants further proposed an Intraformer architecture to encourage more robust connections between positive samples that are far away from the cluster's centroid. It can effectively enhance the purity of hard clusters belonging to minority groups.

Example 1.4 Clustering Purity Penalty Loss

Clustering Accuracy Penalty. In previous methods, clustering performance is optimized via Binary Cross Entropy (BCE) or Softmax function. However, none of these loss functions reflect clustering metrics such as Fowlkes-Mallows (denoted as $F_P$). To achieve better performance, Applicants introduce a novel loss function named Fowlkes-Mallows Loss. No study has been conducted on adopting a supervised loss for the unsupervised clustering problem, so this is the first time Fowlkes-Mallows-based loss has been introduced in deep learning. Given an input cluster $N(x_i)$, the corresponding output of the network is $q_i \in [0, 1]$ estimating a probability for the i-th positive sample having the same cluster ID as the centroid or not. The Fowlkes-Mallows Index (FMI) is measured as, $$f(q_i, \hat{q}_t) = \frac{TP}{\sqrt{(TP+FN)(TP+FP)}} \quad \text{Eqn. (8)}$$

Since $0 \le FMI \le 1$, in order to maximize FMI, Applicants minimize $1-f(q_i, \hat{q}_t)$.

Theoretical Analysis. Since TP, FN, and FP≥0, following Cauchy-Schwarz inequality:

$$\sqrt{(TP+FN)(TP+FP)} \le \frac{1}{2}(2TP+FN+FP) \quad \text{Eqn. (9)}$$

The upper bound of $1-f(q_i, \hat{q}_t)$ is derived as follows:

$$1 - f(q_i, \hat{q}_t) \le 1 - \frac{2TP}{2TP+FN+FP} = \frac{FN+FP}{2TP+FN+FP} = L^{FMI} \quad \text{Eqn. (10)}$$

From this observation, Applicants can maximize the FMI by minimizing the function $L^{FMI}$ In practice, the implementation of $L^{FMI}$ is presented in Algorithm 1, shown below. The converging point is when FP=FN=0, and all TP samples are estimated correctly. Consequently, Applicants adopt $L^{FMI}$ for L in Eqn. (6) to maximize the clustering performance.

Algorithm 1: Pseudocode of Fowlkes-Mallows Loss

```
def fowlkes_mallows_loss (outputs, targets, threshold):
    # outputs: A list of predicted elements
    # targets: A list of ground truths / targets
    # threshold: threshold for outputs binarization
    if threshold is not None:
    outputs = (outputs > threshold).float( )
    tp = torch.sum(outputs * targets)
    fp = torch.sum(outputs) − tp
    fn = torch.sum(targets) − tp
    return (fp + fn) / (2 * tp + fn + fp)
```

Solution to Minimize the Group Discrepancy ΔDP(Φ) of Eqn. (3). Formally, (O2) can be reformulated as:

$$\sum_{i=1}^{p} E_{x_i \sim p(g_i)}\left[L^{fair}(\cdot)\right] \equiv E_{x_i \sim p(X)}\left[L^{fair}(\cdot)\right] \quad \text{Eqn. (11)}$$

where $L^{fair}(\cdot)$ penalizes the discrepancy between $\gamma_i$ of the i-th cluster a reference $\gamma_f$ within a batch as in Eqn. (12).

$$L^{fair} = \frac{1}{B}\sum|\gamma_i - \gamma_f| \quad \text{Eqn. (12)}$$

Here, B is the batch size, and $\gamma_f$ is the fairness point that Applicants want all clusters' purity to converge to.

Selection of $\gamma_f$. If $\gamma_f$ is too small, the $L^{fair}$ is easy to optimize, but the lower value of $\gamma_f$ will decrease the performance overall. If $\gamma_f$ is too large, it will be hard to find the converging points of $L^{fair}$. In order to solve this problem, Applicants define $\gamma_f$ as a flexible value and adaptive according to the current performance of the model during the learning stage. Applicants select $$\gamma_f = \frac{1}{B}\sum_{i}^{B-1} \gamma_i$$

as the average value of $\gamma_i$ within a mini batch. Notice that other selections (such as median and percentile) can still be applicable for $L^{fair}$.

Optimizing with $L^{fair}$. Initially, the network is warmed up with only $L^{FMI}$ loss (i.e. λ=0). Then, as the network achieves considerable accuracy after warming up, λ is gradually increased to penalize the clustering fairness and enhance consistency across clusters.

The choice of $\gamma_i$. With $L^{fair}$ form, besides cluster purity $\gamma_i$, other differential metrics can be flexibly selected. In the following sections, Applicants propose a novel architecture that enhances the performance of hard clusters belonging to minority groups. By doing so, $L^{fair}$ will converge faster.

Example 1.5 Intraformer Architecture

As clusters $N(x_i)$ of the minor group contain a large number of noisy/negative samples (especially when k is large), M easily failed to recognize them. Therefore, rather than learning directly from all samples of the large cluster at once, Applicants propose to first decompose $N(x_i)$ into k sub-clusters. Each sub-cluster $$C_i^m \subset N(x_i)$$

has $$s = \frac{n}{k}$$

samples where $$N(x_i) = \bigcup_{m=0}^{k-1}$$

and $$C_i^0 \cap C_i^1 \ldots \cap C_i^{k-1} = \phi,$$

with 0≤m≤k−1. Because $N(x_i)$ is an unstructured set, two constraints are defined for the sub-clusters to guarantee order consistency, as in Eqn. (13).

$$\begin{cases} sim(x_0, x_j) \geq sim(x_0, x_{j+1}), \\ sim(x_0, x_{s-1}) \geq sim(x_0, x_0^+), \end{cases} \quad \text{Eqn. (13)}$$

where $$x_0, x_j, x_{j+1}, x_{s-1} \in C_i^k$$

rare in a same sub-cluster, while $$x_0^+ \in C_i^{k+1}$$

denotes the sample in the next sub-clusters. Correlations between samples within a sub-cluster and across sub-clusters are then exploited. Moreover, as the size of sub-clusters is kept equal, the balance between positive (hard) and noisy samples is effectively maintained.

Intraformer Architecture. Following constraints in Eqn. (13), the centroid $x_i$ belongs to $$C_i^0.$$

Applicants define the feature of $$C_i^m$$

as the concatenated features $F_m \in R^{s \times d}$ of all samples in $$C_i^m, \text{ i.e. } F_m \triangleq concat(x_0, x_1, \ldots x_{s-1})$$

where $$x_0, x_1, \ldots x_{s-1} \in C_i^m.$$

Figure 3:
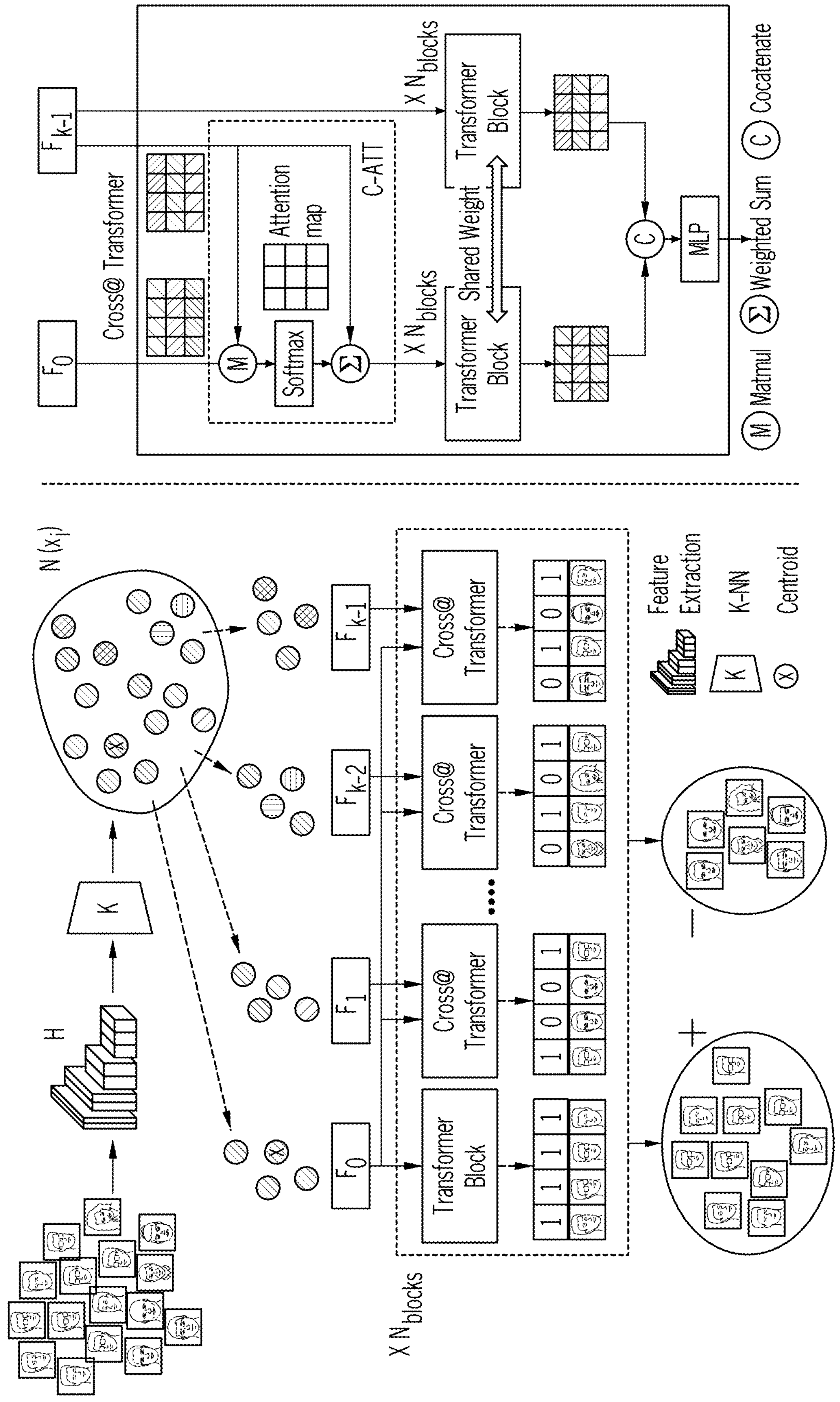
FIG. 3 illustrates an Intraformer framework. The images are fed to the feature extractor H to generate deep feature vectors. For each sample $x_i$, K-nearest neighbor algorithm K is employed to construct the cluster $N(x_i)$. This cluster is decomposed into k sub-clusters named $F_0, \ldots F_{k-1}$ and fed into Intraformer concurrently. Only $F_0$ is passed to the Transformer block while the rest of the sub-clusters go through Cross@Transformer. In this block, C-ATT is employed to explore the global information between two clusters $F_0$ and $F_{k-1}$.

Taking $$\{F_m\}_{m=0}^{k-1}$$

as input, the proposed Intraformer architecture is presented as in FIG. 3. It includes a Transformer block with a self-attention (S-ATT) and (k−1) Cross@transformers which includes both S-ATT and Cross Attention (C-ATT) Mechanisms. Notice that as $$C_i^0$$

includes the centroid of $N(x_i)$, only S-ATT is needed to explore correlations between samples of $$C_i^0.$$

Therefore, Applicants use Transformer blocks for $$C_i^0.$$

For other subclusters, they are fed into Cross@transformer blocks with C-ATT mechanism for measuring correlations to $x_i$.

Decomposing Cluster Benefits Self-Attention Mechanism. Given $i^{th}$ and $j^{th}$ samples of a cluster N(x), their attention score is measured as $$a_{ij} = \frac{e^{\frac{1}{\sqrt{d'}} Q_i K_j^T}}{\sum_{m=1}^{n} e^{\frac{1}{\sqrt{d'}} Q_i K_j^T}},$$

where Q and K denote the query and key in a transformer block, respectively. This score also indicates the importance of their correlation against correlations of $i^{th}$ and other samples in N(x). Let N'(x) be a smaller sub-cluster of N(x) where i, j<n'=|N'(x)|<n. In addition, as $$e^{\frac{1}{\sqrt{d'}}Q_iK_j^T} > 0,$$

Figure 4:
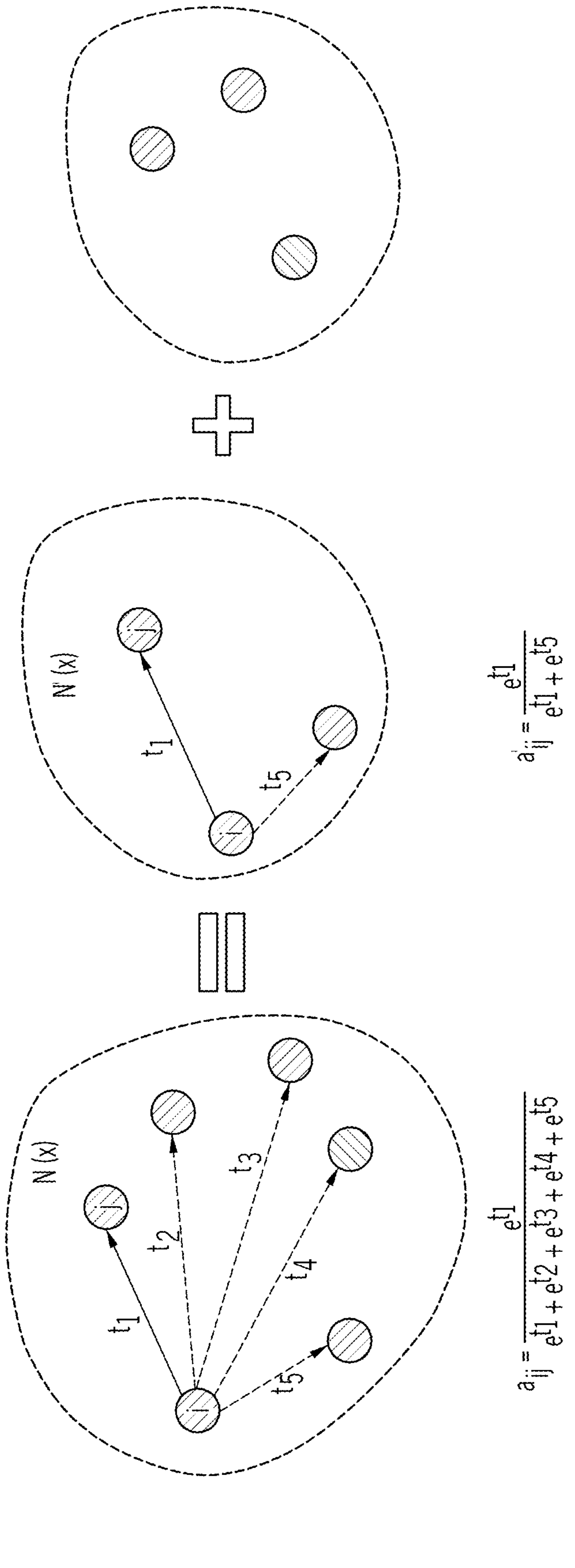
FIG. 4 illustrates N(x) is decomposed to a smaller cluster N'(x) which leads to higher attention score between sample $i^{th}$ and $j^{th}$.

$a_{ij}$ can be rewritten as follows:

$$a_{ij} = \frac{e^{\frac{1}{\sqrt{d'}}Q_iK_j^T}}{\sum_{m=1}^{n'} e^{\frac{1}{\sqrt{d'}}Q_iK_m^T} + \sum_{m=n'}^{n} e^{\frac{1}{\sqrt{d'}}Q_iK_m^T}} < \frac{e^{\frac{1}{\sqrt{d'}}Q_iK_j^T}}{\sum_{m-1}^{n'} e^{\frac{1}{\sqrt{d'}}Q_iK_m^T}} = a'_{ij} \quad \text{Eqn. (14)}$$

where $a_{ij}$' denotes the attention score of the $i^{th}$ and $j^{th}$ samples in N'(x). Therefore, the number of samples in a cluster has big impacts on their attention scores. The more samples are in a cluster, the weaker correlations between samples can be extracted. Thus, decomposing N(x) into multiple smaller sub-clusters will benefit attention mechanism and help M focus on the hard samples. FIG. 4 where $$t \sim \frac{1}{\sqrt{d'}}QK^T$$

briefly demonstrates the cluster decomposition and attention benefits.

Figure 5:
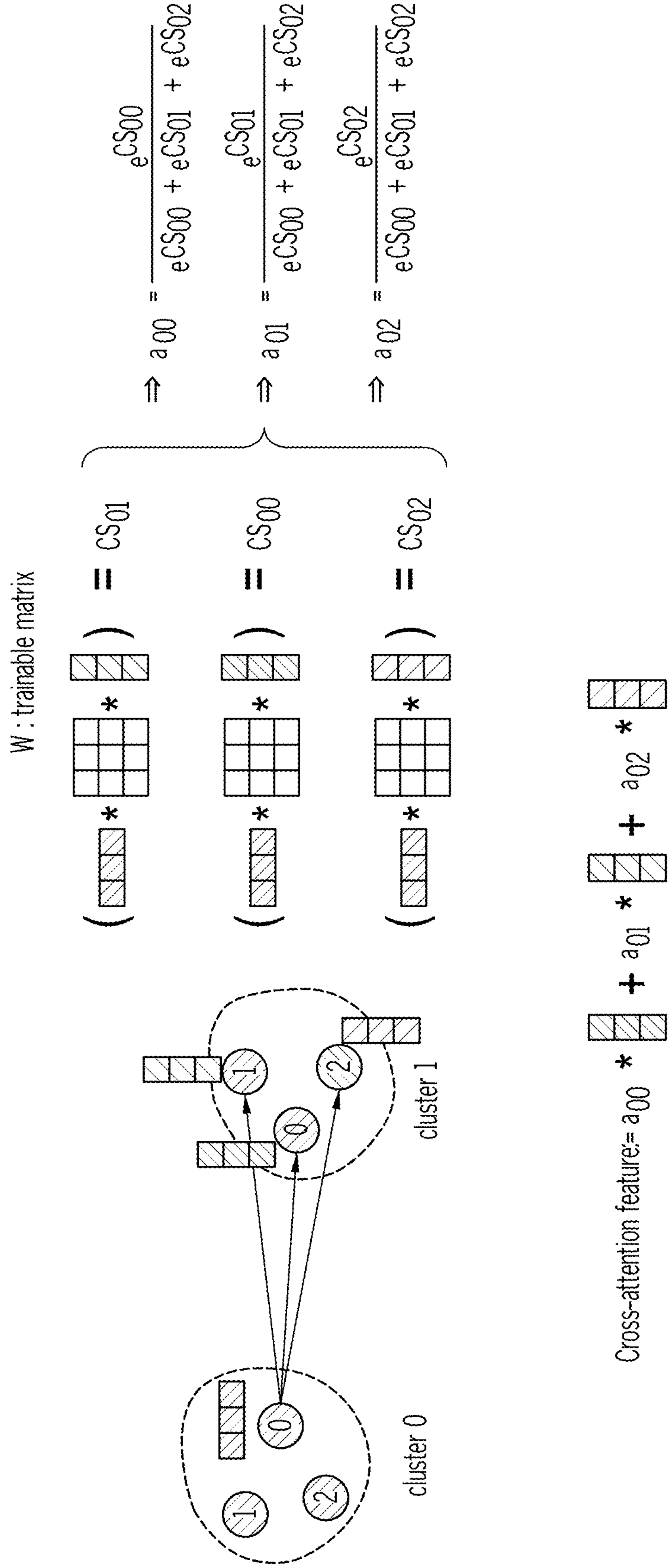
FIG. 5 illustrates that the correlation score is measured by multiple matrix multiplications. The orange vector and blue green vector are represented for the feature of sample-0 in cluster 0 and sample-1 in cluster 1, respectively. These features are fixed. The blue matrix is the learnable correlation matrix.

Cross Sub-cluster Attention Mechanism. As the centroid is only assigned to the first sub-clusters $$C_i^0$$

of $N(x_i)$, dividing into non-overlapped sub-clusters leads to an issue of ignoring the interactions between samples in k−1 subclusters $$(C_i^1, \ldots C_i^{k-1})$$

and its centroid. Given two samples $x_i$ and $x_j$ of two different sub-clusters, Since $x_i$ and $x_j$ are fixed, two learnable matrices $W^i \in R^{d \times d'}$ and $W^j \in R^{d \times d'}$ are presented to transform these features to a new d' dimensional hyperspace where their correlations can be computed as in Eqn. (15)

$$cs_{ij} = (x_iW^i)(x_jW^j)^T = x_iWx_j^T \quad \text{Eqn. (15)}$$

where $W = W^iW^{j^T}$. The illustration of how to measure this correlation score is shown in FIG. 5. In Eqn. (15), the number of parameters in the attention module can be reduced by setting d'=d. Therefore, instead of updating $W^i$ and $W^j$, Applicants need only one trainable matrix $W \in R^{d \times d}$ called correlation matrix to reduce complexity but still keeps the performance of the attention module. As the cosine similarity score is unable to represent the importance of a sample in the cluster, a new attention score is proposed to measure how an out-of-cluster sample $$x_0 \notin C_i^k$$

looks at a sample $x_j$ in the k-th sub-cluster $$C_i^k$$

as follows:

$$a(x_0, x_j) = \frac{\exp(x_0Wx_j^T)}{\sum_{j'=0}^{s-1} \exp(x_0Wx_{j'}^T)} \quad \text{Eqn. (16)}$$

where $\{x_{j'}\}$ denotes all samples of the k-th sub-cluster $$C_i^k;$$

and s is the number of samples in $$C_i^k.$$

Given this new attention score, the attention-based feature of an out-of-cluster sample looking at a cluster $$C_i^k$$

can be computed using weighted sum features as in Eqn. (17).

$$h(x_0, C_i^k) = \sum_{j=0}^{s-1} a(x_0, x_j)x_j \quad \text{Eqn. (17)}$$

Example 1.6 Experiments

Figure 6:
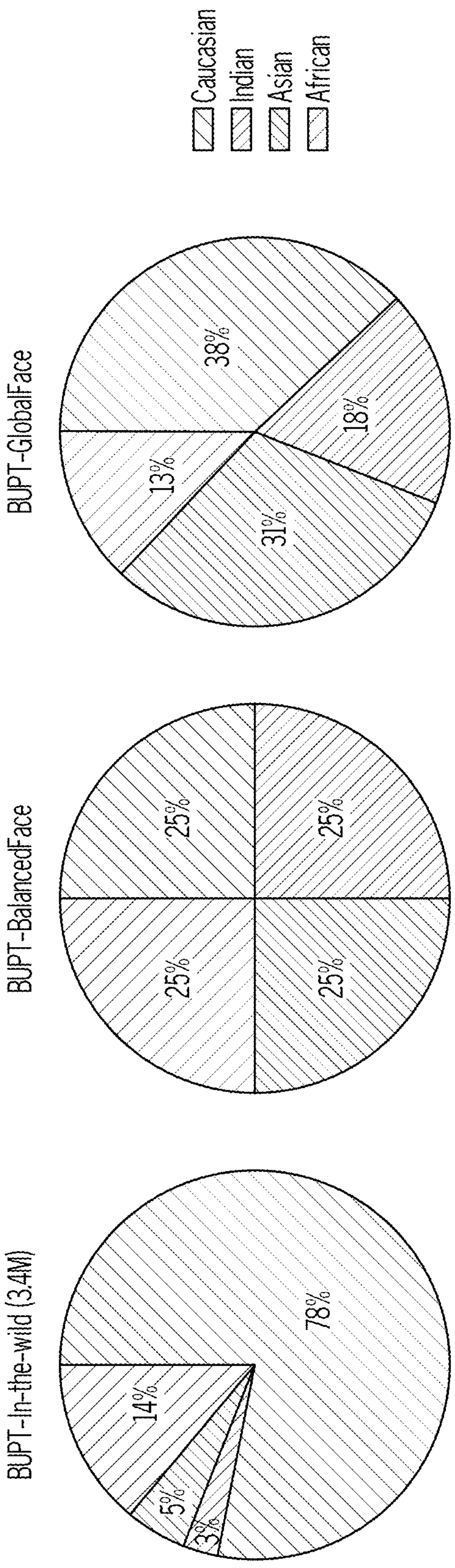
FIG. 6 illustrates distributions of ethnicity in BUPT-In-the-wild, BUPT-BalancedFace and BUPT-GlobalFace.

Datasets. The visual clustering problem is well defined. The most common datasets are MS-Celeb-1M, MNIST-Fashion, and Google Landmark. To evaluate the fairness of clustering methods, demographic attributes are needed. Among these datasets, only BUPT-BalancedFace (i.e., different splits of MS-Celeb-1M) provides this information. For this reason, a subset of MS-Celeb-1M named BUPT-Balancedface (i.e. 1.3M images of 28K celebrities with a race-balance of 7K identities per demographic group) is adopted. Applicants also denote BUPT-In-the-wild (3.4M) as the remaining MS-Celeb-1M after excluding BUPT-Balancedface. This dataset contains 3.4M images of 70K identities and is highly biased in terms of the number of identities per race as well as images per identity. LTC, GCN-V, GCN-E, STAR-FC and Transformer-based methods, i.e., Clusformer, OMHC are used as baselines. Note that LTC, GCN-V, and GCN-V/E generate a large affinity graph without any mechanism to separate this graph into multiple GPUs for training. Thus, BUPT-In-the-wild cannot be used for their training process. Applicants propose to decompose BUPT-In-the-wild into smaller parts as:

(C1) BUPT-In-the-wild (485K). BUPT-In-the-wild (3.4M) is randomly split into 7 parts, each part consisting of 485K samples of 7K identities. The race distributions are similar to BUPT-In-the-wild (3.4M) (see FIG. 6). These parts are sufficient to train LTC, GCN-V, GCN-E, STAR-FC, Clusformer, OMHC, and Intraformer.

(C2) BUPT-GlobalFace (2.2M). This subset contains 2M images from 38K celebrities in total. Its racial distribution is approximately the same as the real distribution of the world's population. Compared to the BUPT-In-the-wild (485K), this subset is more balanced in racial distribution. Only STAR-FC, Clusformer, OMHC, and Intraformer are implemented to run on this subset since there are out-of-memory issues with LTC, GCN-V, and GCN-E.

(C3) BUPT-GlobalFace (3.4M). This configuration is to evaluate the fairness with respect to racial attributes against large-scale data of 3.4M images with a highly biased distribution. Similar to BUPT-GlobalFace (2.2M), Only STAR-FC, Clusformer, OMHC, and Intraformer are included.

Metrics. Pairwise F-score ($F_P$), BCubed F-score ($F_B$), and NMI are adopted for evaluation as in previous benchmarking protocols. To measure the fairness of a method on a demographic, Applicants measure the clustering performance on all attributes of this demographic and estimate the standard deviation std among them following previous works. The lower value of std, the better the fairness method is.

Implementation Details. Applicants get the feature extractor H by training resnet34 with Arcface loss on BUPT-In-the-wild (3.4) within 20 epochs. The embedding feature is d=512 dimension. This model is then adopted to extract latent features followed by a k-NN K to construct initial clusters. The architecture of the Intraformer contains two main blocks, i.e. Transformer and Cross Transformer. In each block, transformers are stacked Nblock times continuously and in each transformers block, self-attention is divided into multiple heads $N_{head}$·k=4, $N_{block}$=6 and $N_{head}$=4, and n=256. The network is trained in 10 epochs with Adam optimizer. The learning rate starts at 0.0001 and reduces following the cosine annealing. The loss weight of (01) is equal to (02) in all experiments.

Results

Figure 7A:
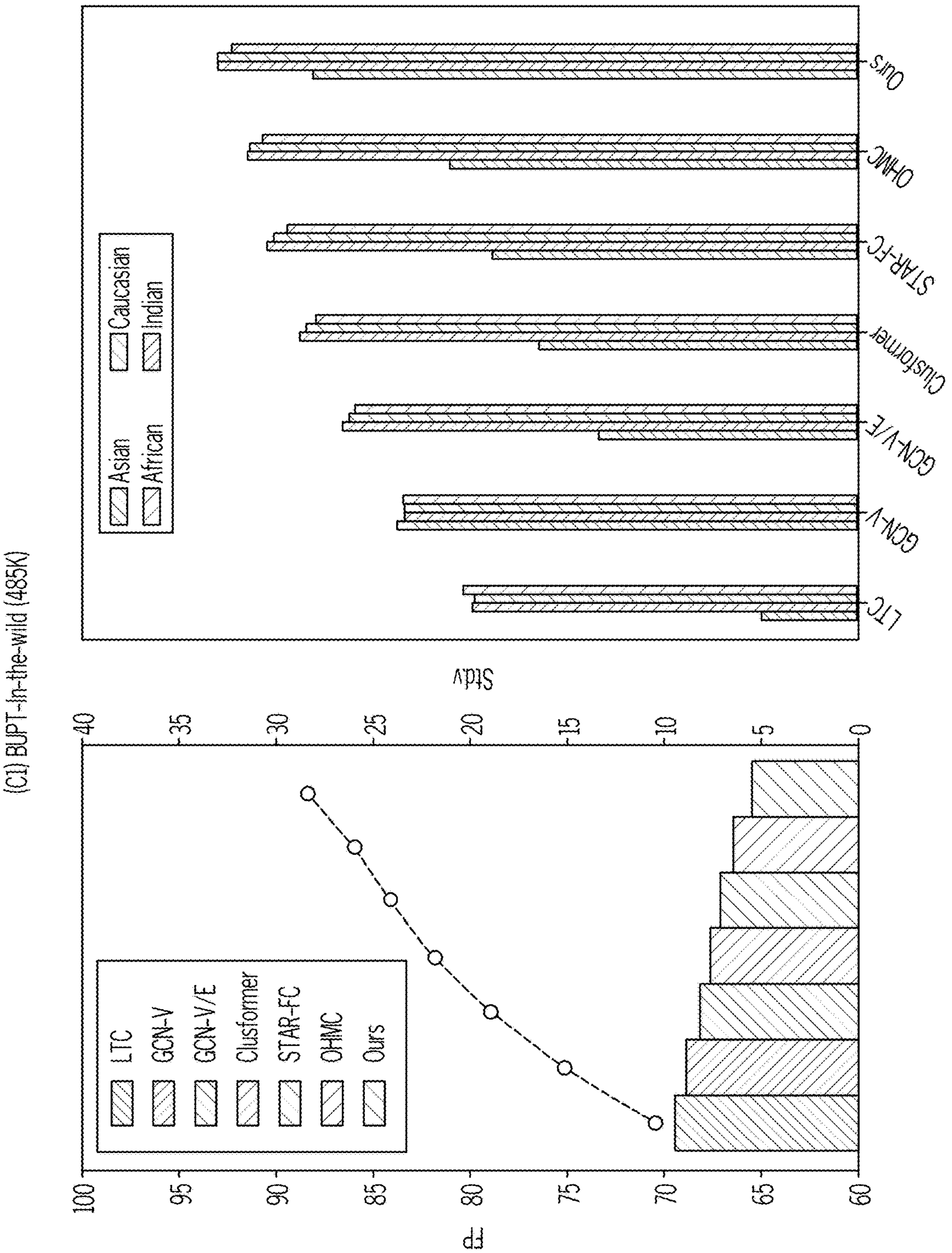
FIGS. 7A-7C illustrates comparison of fairness w.r.t the race of identity on BUPT-BalancedFace.
Figure 7B:
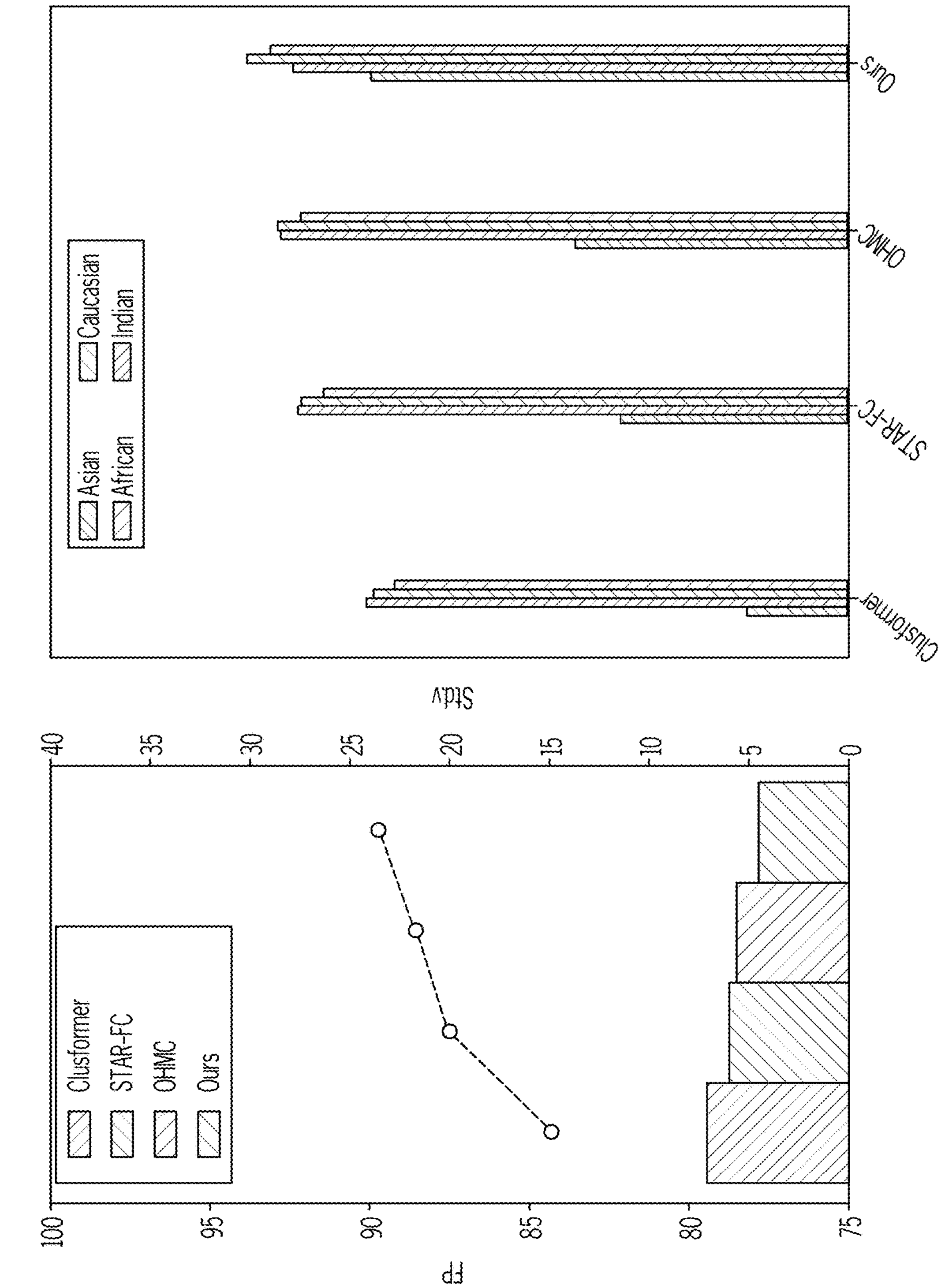
Figure 7C:
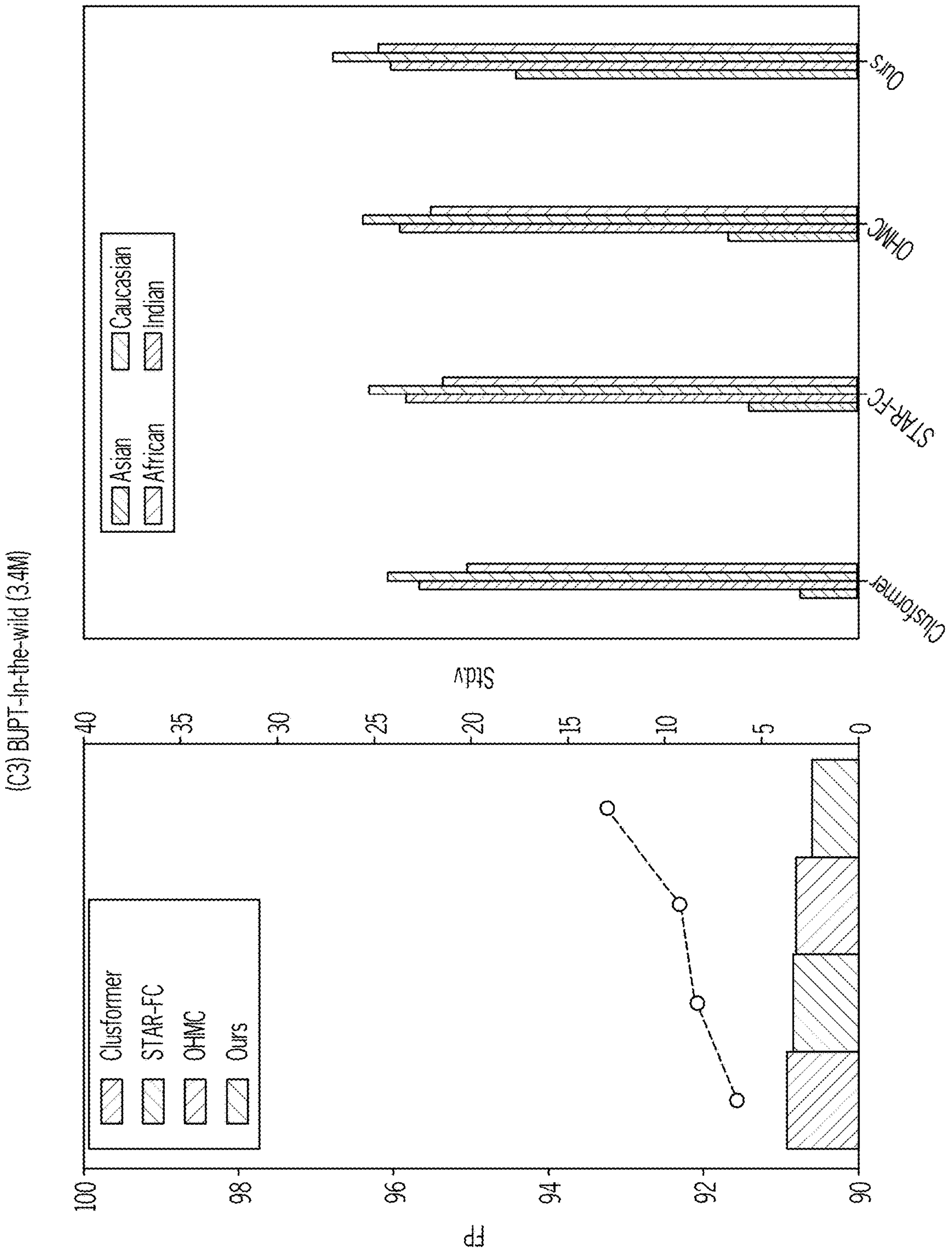
Figure 8A:
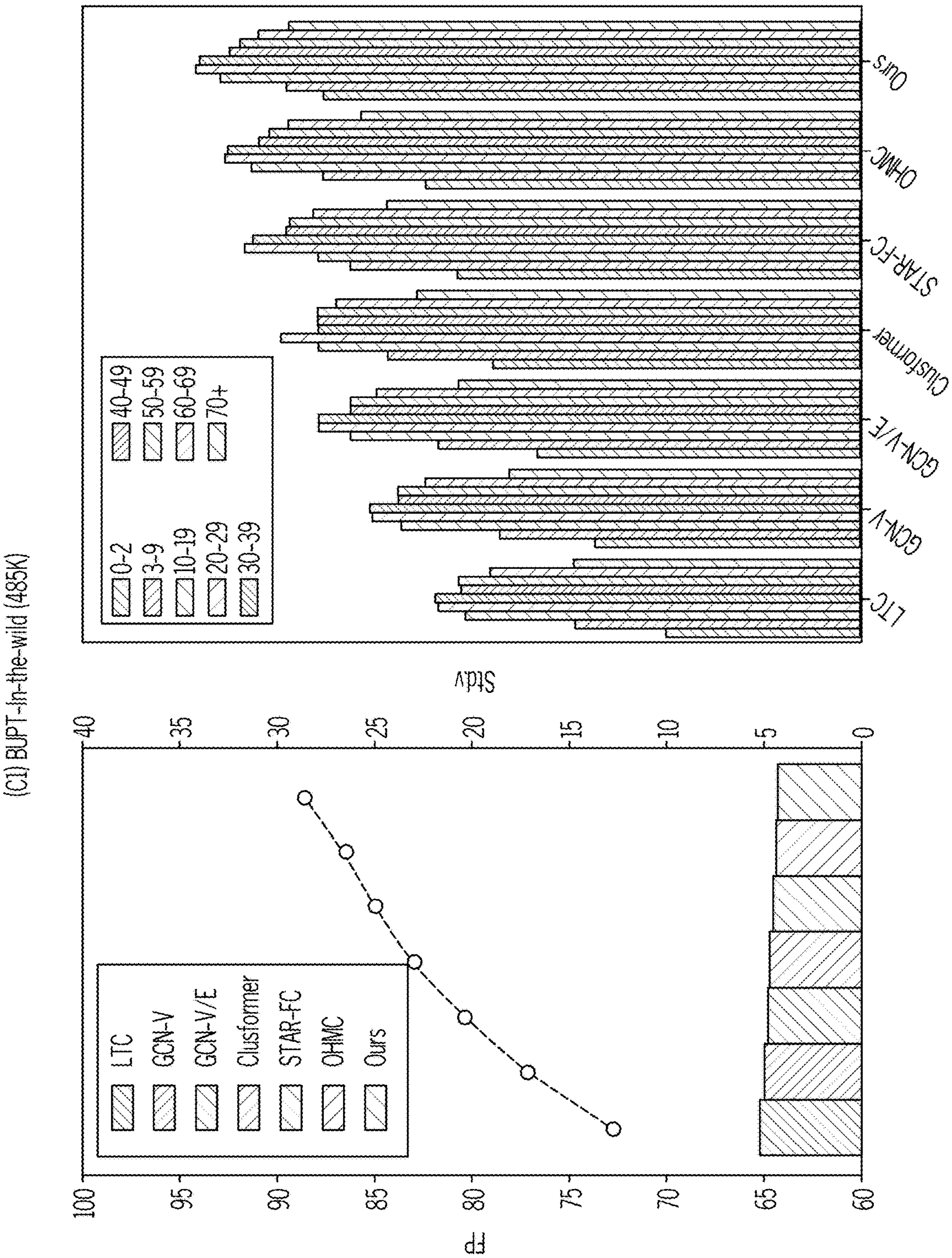
FIGS. 8A-8C illustrate comparison of fairness w.r.t the age of identity on BUPT-BalancedFace.
Figure 8B:
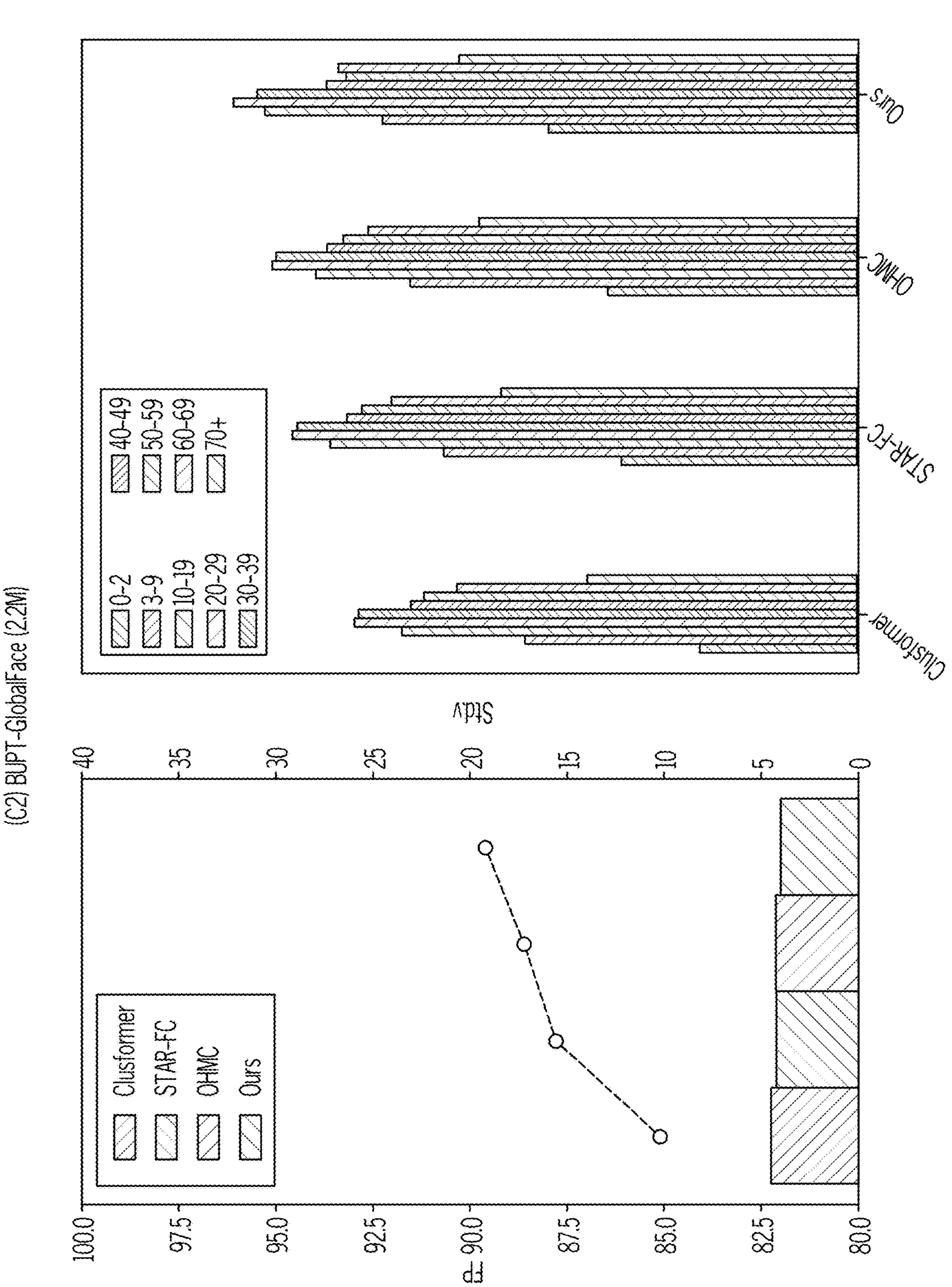
Figure 8C:
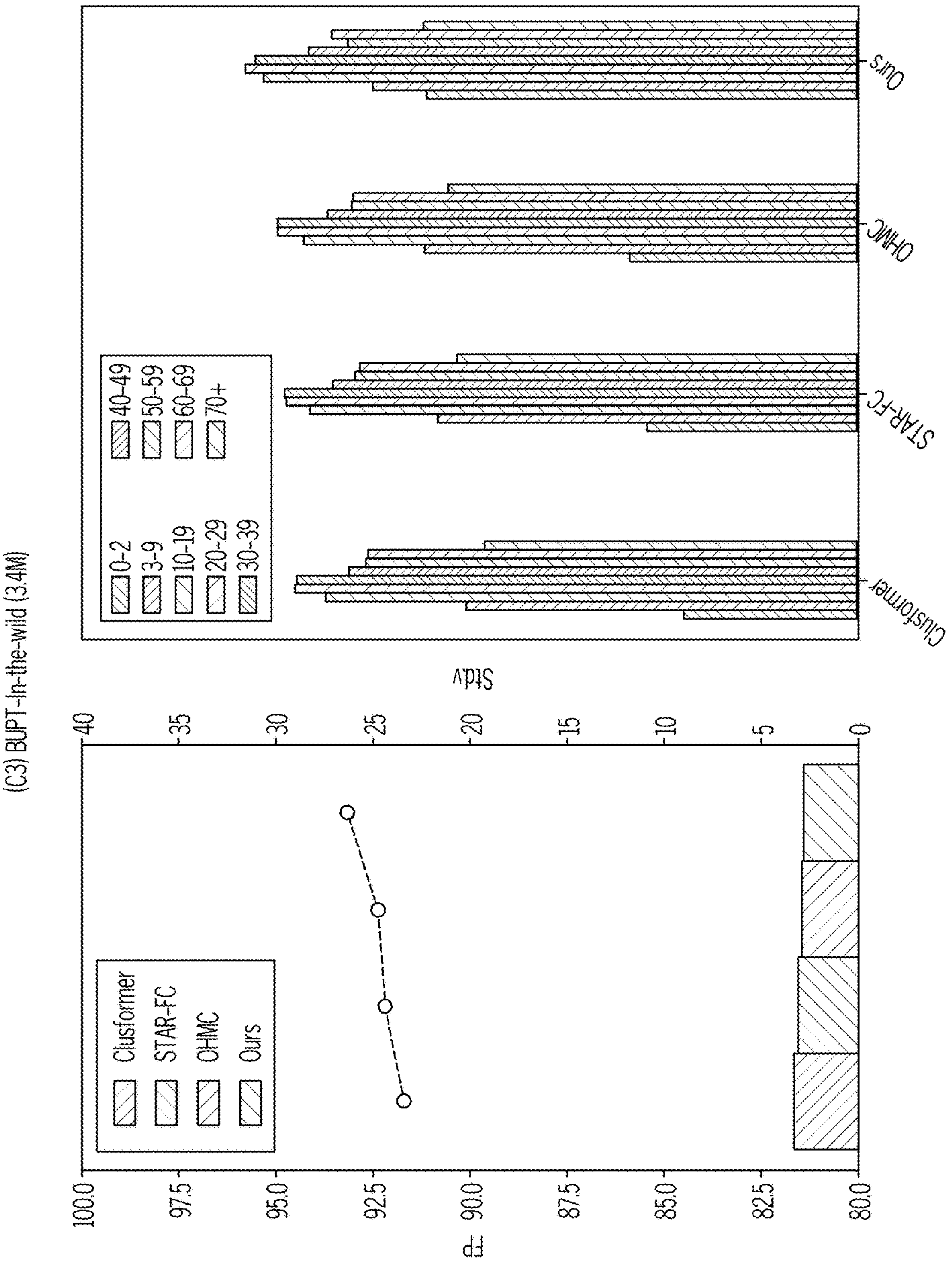
Figure 9A:
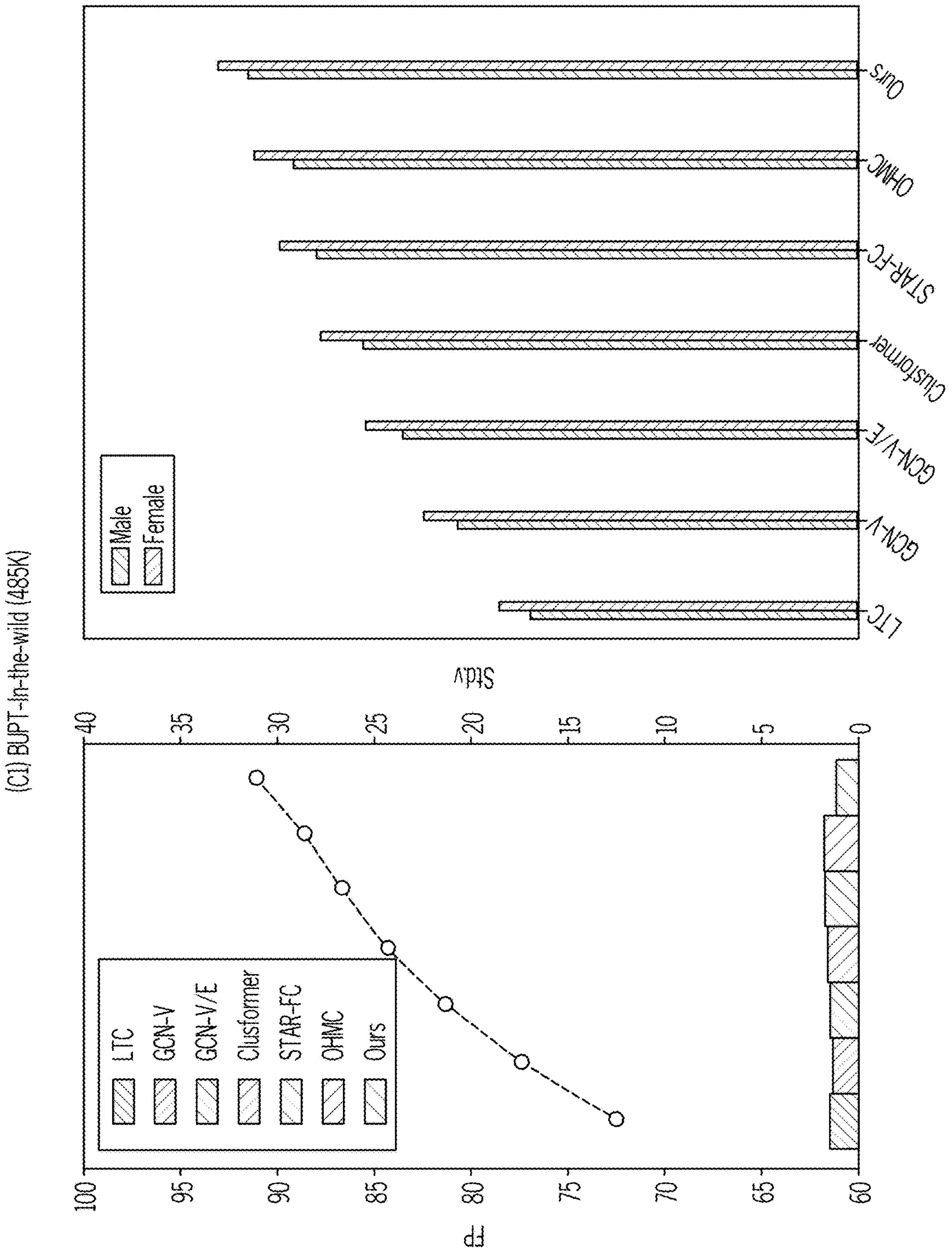
FIGS. 9A-9C illustrate comparison of fairness w.r.t the gender of identity on BUPT-BalancedFace.
Figure 9B:
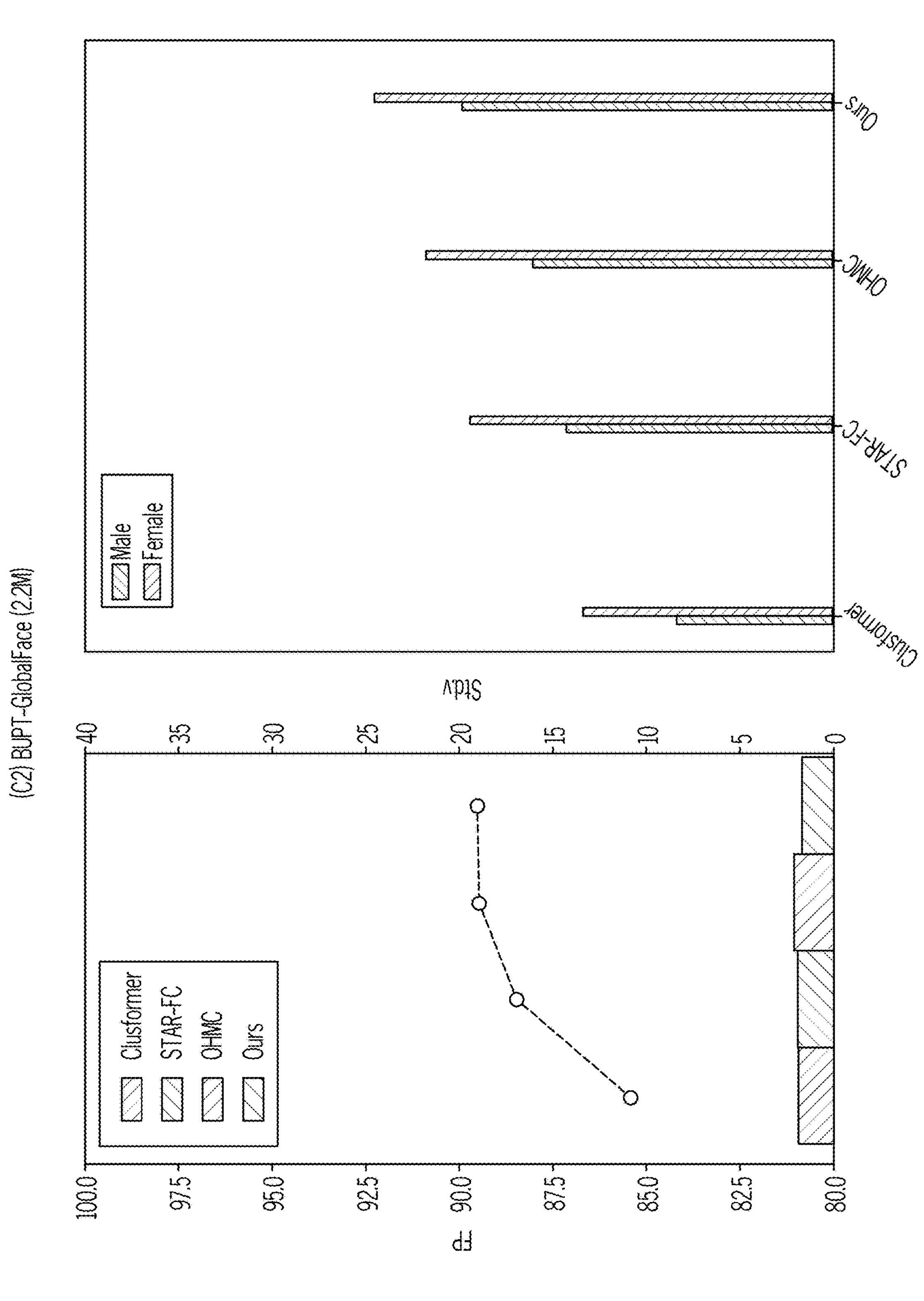
Figure 9C:
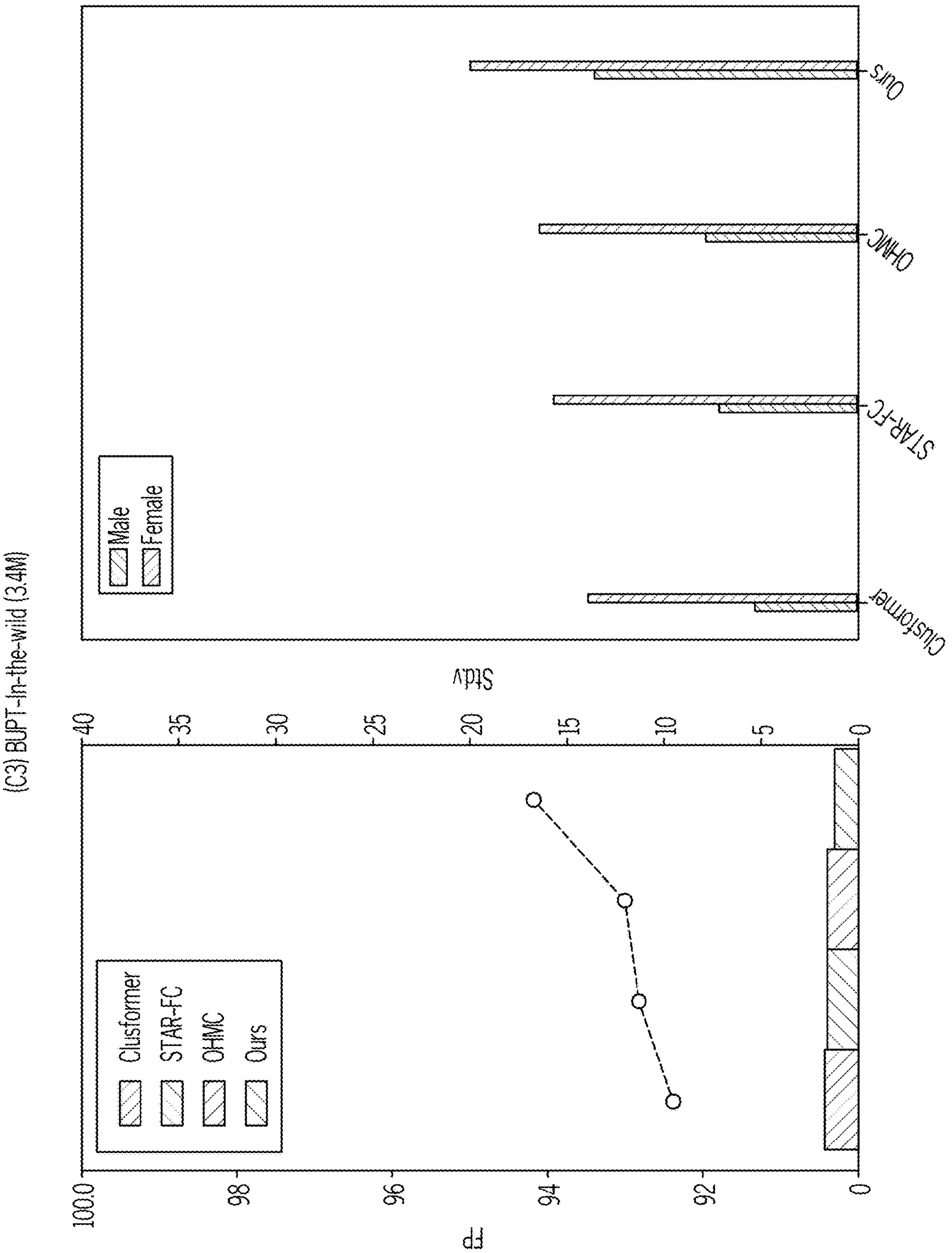
Figure 10A:
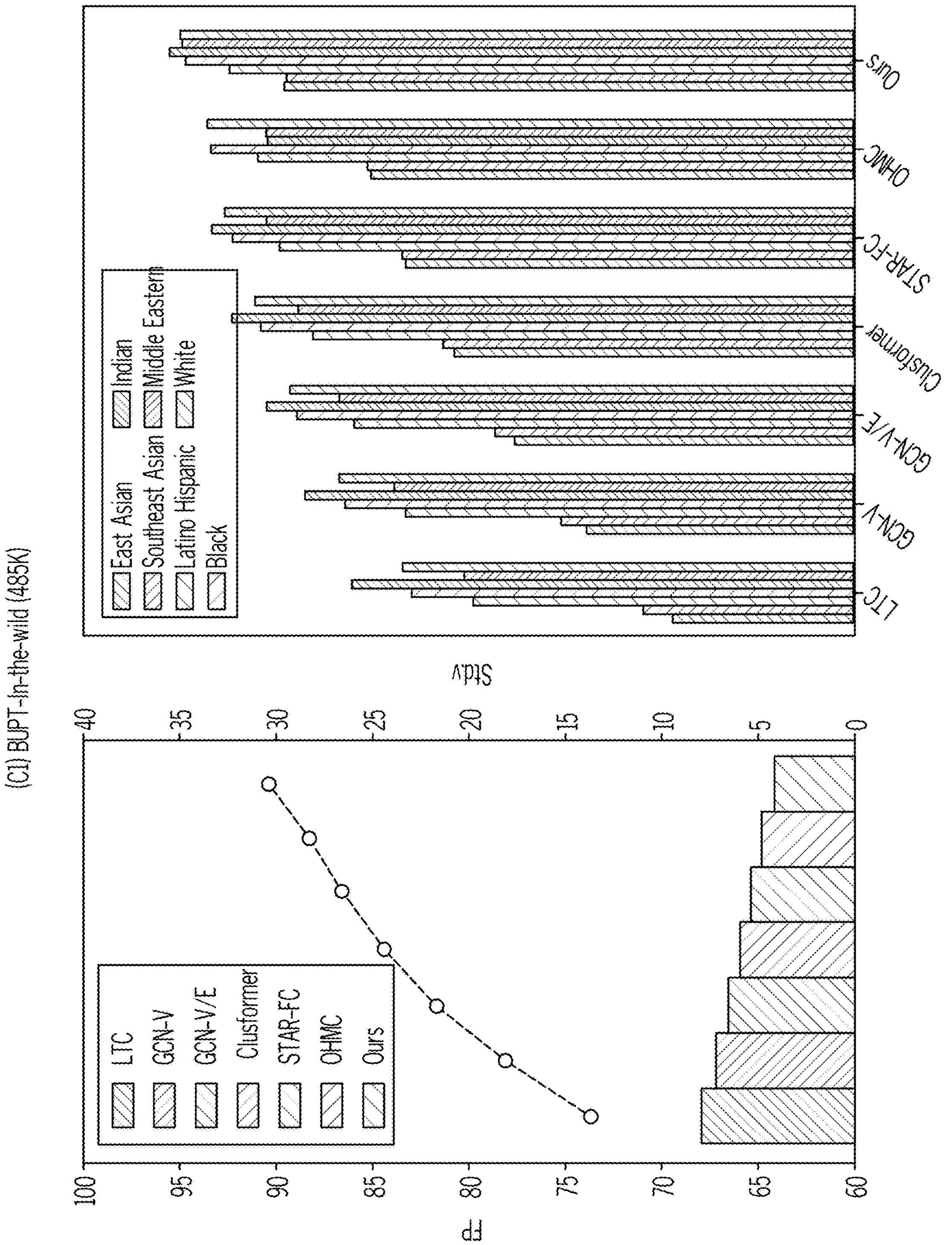
FIGS. 10A-10C illustrate comparison of fairness w.r.t the ethnicity (7 attributes) of identity on BUPT-BalancedFace.
Figure 10B:
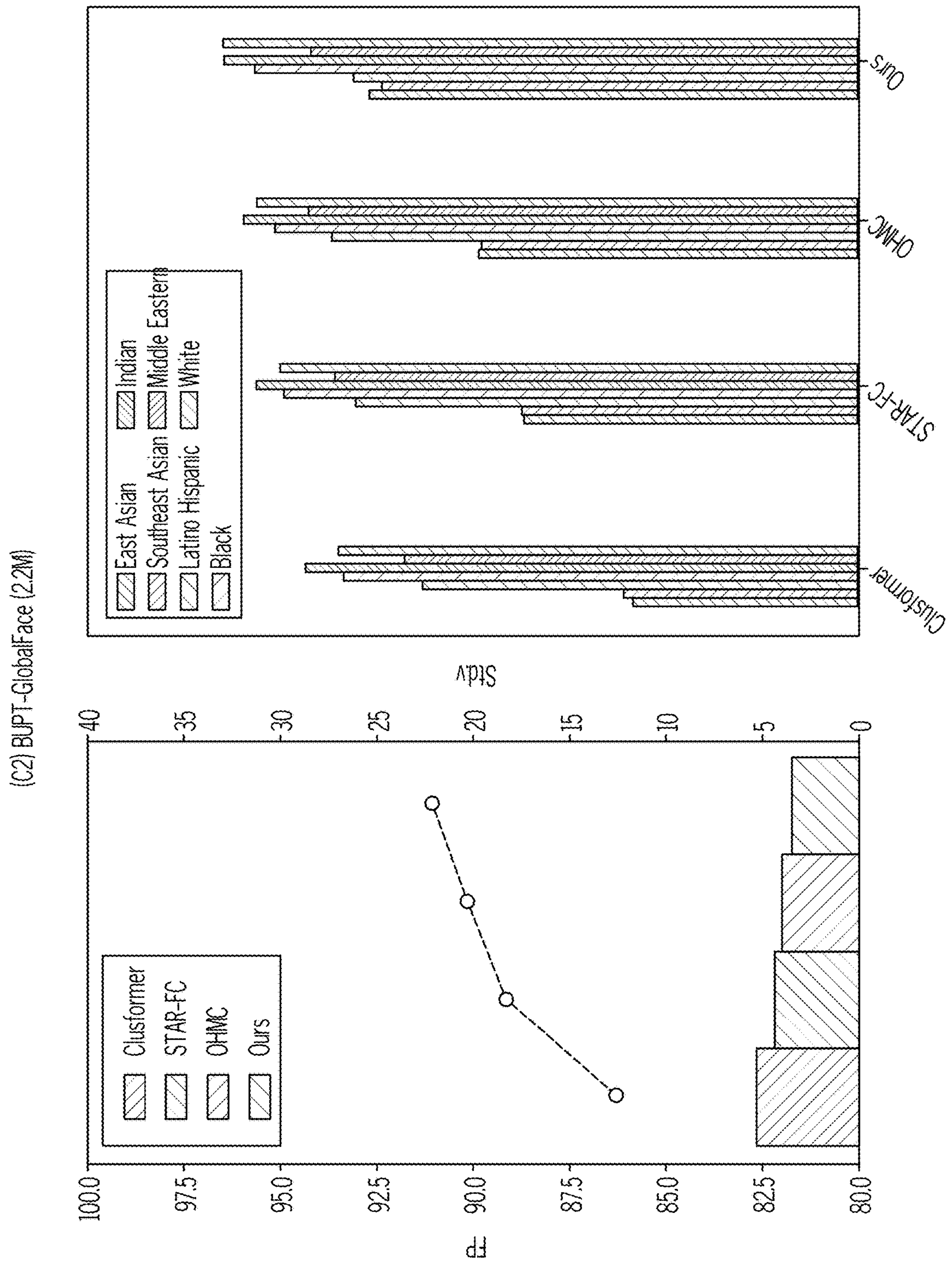
Figure 10C:
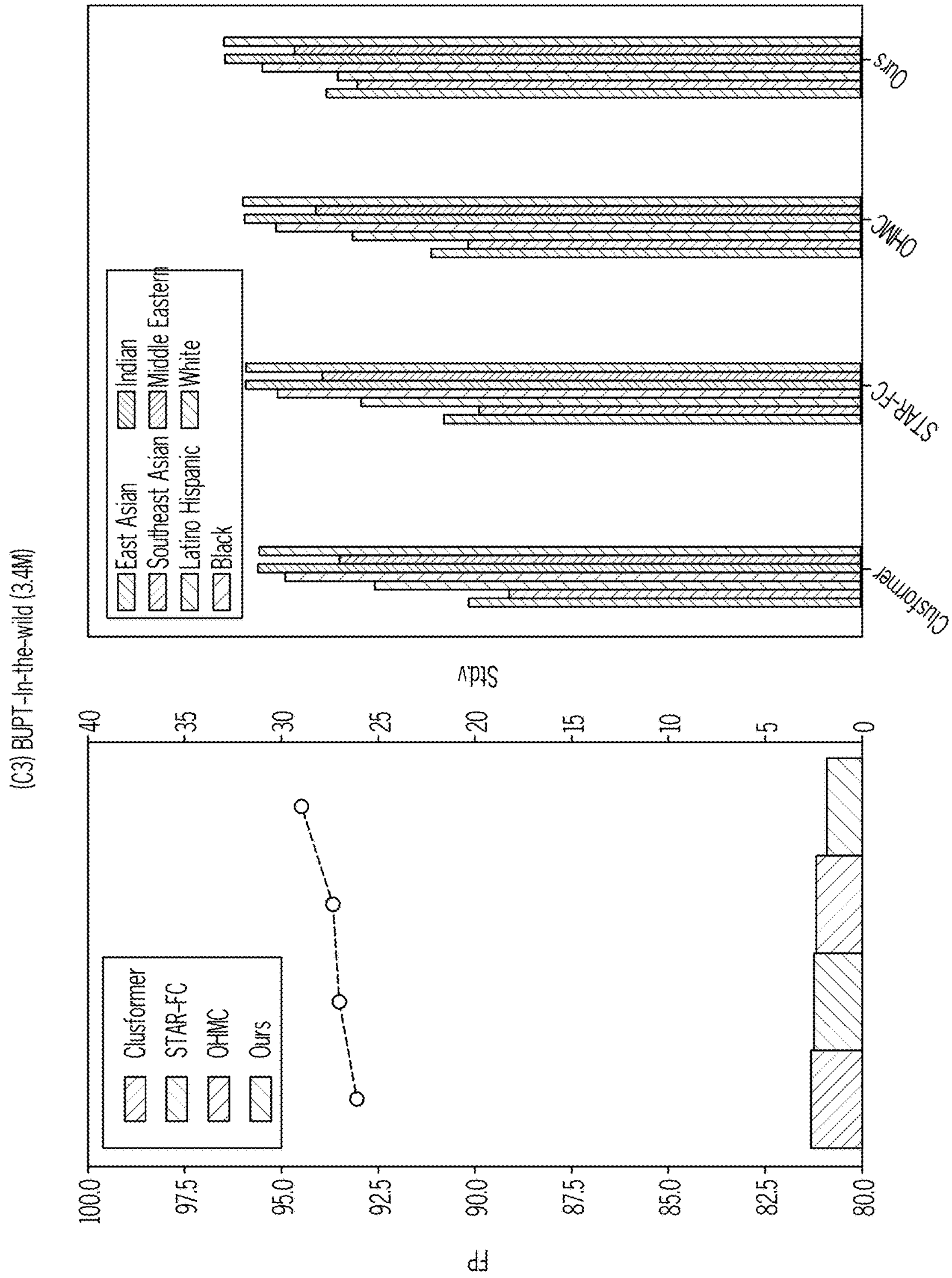

Fairness on Ethnicity. FIGS. 7A-7C show the performance of clustering algorithms' results on three different training configurations (C1, FIG. 7A), (C2, FIG. 7B), and (C3, FIG. 7C). The bars represent the standard deviation of each method and are measured on the right-side vertical axis. The scatter plot shows the average $F_P$ score of each and is measured by the vertical axis on the left side of the chart. The second chart in each configuration shows the $F_P$ score of each method in each category. Thus, each method's fairness is determined by the proximity of the bars with greater proximity representing greater fairness.

Overall, Applicants' method outperforms others in their respective categories. In configuration (C1), Intraformer achieved an $F_B$ of 88.41% which is higher than the SOTA of GCN-based STAR-FC and Transformer-based OMHC by 4% and 3%, respectively. In addition, the results demonstrate that Applicants' method is the fairest by scoring 5.41% on std, lower than the second-best OMHC by 1.1%. In configuration (C2), when the number of training samples is 4.5 times larger than (C1) and the distribution of demographic attributes is more balanced, improved performance is expected. All methods get higher scores than (C1) in all categories, and Intraformer stills holds the best performance in terms of accuracy (89.49%) and fairness (4.40%) among Clusformer, STAR-FC, and OMHC. In configuration (C3), where the number of samples is 3.4M images, but the distribution of demographic attributes is highly biased, it is interesting to note that the performance is higher than (C2). Once again, the best results are achieved by Intraformer when trained on the largest dataset, with $F_P$ of 93.28% and std of 2.47%. In practice, obtaining (C2) is difficult since demographic annotations are required. Instead, (C3) is preferred as it is easy to collect. Configuration (C3) illustrates that Applicants' method is efficiently handling highly biased training databases and achieves both better fairness and clustering performance. Applicants observe similar results on the $F_B$ and NMI metrics as well.

TABLE 1

Comparison of fairness w.r.t the ethnicity of identity on BUPT-BalancedFace. The results are reported in $F_P$, $F_B$ and NMI metrics.

| | $F_P$ | | | | | | $F_B$ | | | | | | NMI | | | | | |
|---|---|---|---|---|---|---|---|---|---|---|---|---|---|---|---|---|---|---|
| Method | Asi | Afr | Cau | Ind | Mean | STD | Asi | Afr | Cau | Ind | Mean | STD | Asi | Afr | Cau | Ind | Mean | STD |
| (C1) BUPT-In-the-wild (485K) | | | | | | | | | | | | | | | | | | |
| LTC | 56.3 | 74.96 | 74.73 | 75.49 | 70.37 | 9.39 | 59.38 | 74.73 | 74.39 | 75.85 | 71.09 | 7.83 | 91.52 | 94.07 | 93.92 | 94.25 | 93.44 | 1.29 |
| GCN-V | 61.98 | 79.68 | 79.3 | 79.43 | 75.1 | 8.75 | 64.59 | 79.2 | 78.76 | 79.35 | 75.48 | 7.26 | 92.48 | 95.05 | 94.91 | 95.06 | 94.38 | 1.27 |
| GCN-V/E | 66.74 | 83.28 | 82.99 | 82.54 | 78.89 | 8.1 | 68.87 | 82.59 | 82.24 | 82.14 | 78.96 | 6.73 | 93.27 | 95.8 | 95.69 | 95.69 | 95.11 | 1.23 |
| Clusformer | 70.64 | 86.05 | 85.7 | 85.03 | 81.86 | 7.49 | 72.38 | 85.17 | 84.81 | 84.32 | 81.67 | 6.2 | 93.94 | 96.36 | 96.28 | 96.19 | 95.69 | 1.17 |
| STAR-FC | 73.62 | 88.22 | 87.87 | 86.89 | 84.15 | 7.04 | 75.18 | 86.91 | 86.68 | 85.88 | 83.66 | 5.68 | 94.26 | 96.85 | 96.67 | 96.59 | 96.09 | 1.22 |
| OMHC | 76.43 | 89.54 | 89.42 | 88.46 | 85.96 | 6.37 | 77.49 | 88.42 | 88.31 | 87.35 | 85.39 | 5.29 | 94.92 | 97.1 | 97.08 | 96.88 | 96.5 | 1.05 |
| DISCLOSURE | 80.32 | 91.4 | 91.45 | 90.48 | 88.41 | 5.41 | 80.84 | 90.02 | 90.17 | 89.04 | 87.52 | 4.48 | 95.52 | 97.44 | 97.5 | 97.26 | 96.93 | 0.95 |
| (C2) BUPT-GlobalFace (2.2M) | | | | | | | | | | | | | | | | | | |
| Clusformer | 73.85 | 88.07 | 87.79 | 87.02 | 84.18 | 6.9 | 75.23 | 87.06 | 86.8 | 86.08 | 83.79 | 5.72 | 94.48 | 96.79 | 96.73 | 96.59 | 96.15 | 1.11 |
| STAR-FC | 78.56 | 90.61 | 90.53 | 89.65 | 87.34 | 5.87 | 79.35 | 89.34 | 89.34 | 88.36 | 86.6 | 4.85 | 95.26 | 97.3 | 97.31 | 97.11 | 96.75 | 0.99 |
| OMHC | 80.22 | 91.29 | 91.4 | 90.54 | 88.36 | 5.44 | 80.73 | 90.19 | 90.06 | 88.81 | 87.45 | 4.52 | 95.31 | 97.34 | 97.71 | 97.06 | 96.85 | 1.06 |
| DISCLOSURE | 82.96 | 90.89 | 92.51 | 91.59 | 89.49 | 4.4 | 83.92 | 91.19 | 91.9 | 90.33 | 89.34 | 3.67 | 95.93 | 97.5 | 97.75 | 97.44 | 97.16 | 0.83 |
| (C3) BUPT-In-the-wild (3.4M) | | | | | | | | | | | | | | | | | | |
| Clusformer | 86.14 | 93.48 | 94.09 | 92.55 | 91.57 | 3.67 | 86.53 | 92.89 | 93.48 | 91.61 | 91.13 | 3.16 | 96.5 | 98.11 | 98.26 | 97.81 | 97.67 | 0.8 |
| STAR-FC | 87.15 | 93.76 | 94.46 | 93.05 | 92.11 | 3.35 | 87.52 | 93.26 | 93.93 | 92.18 | 91.72 | 2.89 | 96.74 | 98.21 | 98.38 | 97.96 | 97.82 | 0.74 |
| OMHC | 87.87 | 93.87 | 94.6 | 93.25 | 92.32 | 3.22 | 87.93 | 93.4 | 94.12 | 92.41 | 91.97 | 2.78 | 96.84 | 98.25 | 98.43 | 98.02 | 97.89 | 0.72 |
| DISCLOSURE | 89.65 | 94.04 | 95.15 | 94.28 | 93.28 | 2.47 | 90.04 | 93.01 | 94.87 | 93.5 | 93.08 | 2.11 | 97.42 | 98.36 | 98.63 | 98.31 | 98.18 | 0.53 |

Asi: Asian, Afr: African, Cau: Caucasian, Ind: Indian.

Fairness on Different Demographics. Applicants study the fairness of their methods in different demographics such as age, gender, and race. In particular, the pre-trained model on FairFace is employed to predict these demographics for each subject in the BUPT-BalancedFace database. A threshold of 0.9 is applied to filter out the uncertain samples and keep only the most confident images for evaluation. Applicants conduct experiments and measure fairness on 9 ranges of age (0-2, 3-9, 10-19, 20-29, 30-39, 40-49, 50-59, 60-69, and 70+), 2 groups of gender (Male and Female) and 7 racial groups (East Asian, Southeast Asian, Latino Hispanic, Black, Indian, Middle Eastern, White). These results are reported in FIGS. 8A-8C, FIGS. 9A-9C, and FIGS. 10A-10C, respectively.

TABLE 2

Comparison of fairness w.r.t the pseudo gender of identity on BUPT-BalancedFace. The results are reported in $F_P$, $F_B$ and NMI metrics.

| | $F_P$ | | | | $F_B$ | | | | NMI | | | |
|---|---|---|---|---|---|---|---|---|---|---|---|---|
| Method | Male | Female | Mean | STD | Male | Female | Mean | STD | Male | Female | Mean | STD |
| (C1) BUPT-In-the-wild (485K) | | | | | | | | | | | | |
| LTC | 71.0 | 73.03 | 72.02 | 1.44 | 71.94 | 72.22 | 72.08 | 0.2 | 94.39 | 93.88 | 94.14 | 0.36 |
| GCN-V | 75.67 | 77.65 | 76.66 | 1.4 | 76.17 | 76.59 | 76.38 | 0.3 | 95.17 | 94.82 | 95.0 | 0.25 |
| GCN-V/E | 79.29 | 81.43 | 80.36 | 1.51 | 79.43 | 80.18 | 79.81 | 0.53 | 95.77 | 95.58 | 95.68 | 0.13 |
| Clusformer | 82.09 | 84.36 | 83.22 | 1.61 | 81.95 | 82.97 | 82.46 | 0.72 | 96.24 | 96.19 | 96.22 | 0.04. |
| STAR-FC | 84.39 | 86.87 | 85.63 | 1.75 | 84.09 | 85.11 | 84.6 | 0.72 | 96.5 | 96.45 | 96.47 | 0.04 |
| OMHC | 85.87 | 88.41 | 87.14 | 1.8 | 85.32 | 86.85 | 86.08 | 1.08 | 96.88 | 97.02 | 96.95 | 0.1 |
| DISCLOSURE | 89.08 | 90.74 | 89.91 | 1.17 | 89.2 | 89.03 | 89.12 | 0.12 | 97.21 | 97.48 | 97.34 | 0.19 |
| (C2) BUPT-GlobalFace (2.2M) | | | | | | | | | | | | |
| Clusformer | 84.22 | 86.7 | 85.46 | 1.75 | 83.86 | 85.21 | 84.54 | 0.95 | 96.61 | 96.67 | 96.64 | 0.04 |
| STAR-FC | 87.14 | 89.71 | 88.42 | 1.82 | 86.4 | 88.07 | 87.24 | 1.18 | 97.08 | 97.28 | 97.18 | 0.14 |
| OMHC | 88.02 | 90.88 | 89.45 | 2.02 | 87.39 | 88.89 | 88.14 | 1.06 | 96.97 | 97.71 | 97.34 | 0.53 |
| DISCLOSURE | 89.88 | 92.13 | 89.5 | 1.59 | 89.78 | 90.89 | 90.34 | 0.78 | 97.6 | 97.74 | 97.67 | 0.1 |
| (C3) BUPT-In-the-wild (3.4M) | | | | | | | | | | | | |
| Clusformer | 91.31 | 93.46 | 92.38 | 1.52 | 90.95 | 92.26 | 91.6 | 0.93 | 97.92 | 98.1 | 98.01 | 0.13 |
| STAR-FC | 91.77 | 93.9 | 92.84 | 1.51 | 91.51 | 92.82 | 92.16 | 0.93 | 98.05 | 98.24 | 98.14 | 0.13 |
| OMHC | 91.94 | 94.08 | 93.01 | 1.51 | 91.74 | 93.06 | 92.4 | 0.93 | 98.1 | 98.29 | 98.2 | 0.13 |
| DISCLOSURE | 93.37 | 94.98 | 94.18 | 1.14 | 93.73 | 94.16 | 93.94 | 0.3 | 98.42 | 98.59 | 98.5 | 0.12 |

TABLE 3

Comparison of fairness w.r.t the pseudo ethnicity of identity on BUPT-BalancedFace. The results are reported in $F_P$, $F_B$ and NMI metrics.

| | $F_P$ | | | | | | $F_B$ | | |
|---|---|---|---|---|---|---|---|---|---|
| Method | Asian | Indian | Black | White | Mean | STD | Asian | Indian | Black |
| (C1) BUPT-In-the-wild (485K) | | | | | | | | | |
| LTC | 60.15 | 77.26 | 75.81 | 76.47 | 72.42 | 8.2 | 64.49 | 76.9 | 75.8 |
| GCN-V | 65.62 | 81.25 | 80.33 | 80.81 | 77.0 | 7.6 | 69.26 | 80.57 | 79.8 |
| GCN-V/E | 70.18 | 84.46 | 83.64 | 84.22 | 80.63 | 6.97 | 73.18 | 83.51 | 82.8 |
| Clusformer | 73.95 | 86.89 | 86.27 | 86.67 | 83.45 | 6.34 | 76.39 | 85.75 | 85.16 |
| STAR-FC | 77.1 | 89.04 | 88.22 | 88.42 | 85.7 | 5.74 | 78.95 | 87.68 | 87.0 |
| OMHC | 79.33 | 90.22 | 89.64 | 90.06 | 87.31 | 6.33 | 80.96 | 88.83 | 88.2 |
| DISCLOSURE | 82.93 | 92.11 | 91.34 | 91.96 | 89.59 | 4.45 | 83.89 | 90.5 | 89.64 |
| (C2) BUPT-GlobalFace (2.2M) | | | | | | | | | |
| Clusformer | 76.91 | 88.84 | 88.19 | 88.58 | 85.63 | 5.82 | 78.91 | 87.55 | 86.91 |
| STAR-FC | 81.3 | 91.31 | 90.61 | 91.13 | 88.59 | 4.87 | 82.6 | 89.8 | 89.03 |
| OMHC | 82.89 | 92.39 | 91.11 | 91.8 | 89.54 | 4.46 | 84.13 | 90.25 | 89.74 |
| DISCLOSURE | 85.37 | 92.7 | 90.65 | 92.73 | 90.36 | 3.47 | 80.42 | 91.74 | 90.73 |
| (C3) BUPT-In-the-wild (3.4M) | | | | | | | | | |
| Clusformer | 88.21 | 94.13 | 93.54 | 94.29 | 92.54 | 2.91 | 88.71 | 93.11 | 92.45 |
| STAR-FC | 89.04 | 94.49 | 93.81 | 94.65 | 93.0 | 2.66 | 89.51 | 93.56 | 92.84 |
| OMHC | 89.38 | 94.63 | 93.91 | 94.79 | 93.18 | 2.56 | 89.85 | 93.75 | 92.99 |
| DISCLOSURE | 91.21 | 95.29 | 94.0 | 95.31 | 93.95 | 1.93 | 91.62 | 94.57 | 93.59 |

| | $F_B$ | | | NMI | | | | | |
|---|---|---|---|---|---|---|---|---|---|
| Method | White | Mean | STD | Asian | Indian | Black | White | Mean | STD |

TABLE 3-continued

Comparison of fairness w.r.t the pseudo ethnicity of identity on BUPT-BalancedFace. The results are reported in $F_P$, $F_B$ and NMI metrics.

| | | | | | | | | | |
|---|---|---|---|---|---|---|---|---|---|
| (C1) BUPT-In-the-wild (485K) | | | | | | | | | |
| LTC | 75.86 | 73.26 | 5.87 | 92.83 | 95.28 | 94.85 | 94.84 | 94.45 | 1.1 |
| GCN-V | 79.89 | 77.88 | 5.42 | 93.7 | 96.01 | 95.66 | 95.67 | 95.26 | 1.05 |
| GCN-V/E | 83.05 | 80.64 | 4.98 | 94.43 | 96.59 | 96.27 | 96.32 | 95.9 | 0.99 |
| Clusformer | 85.36 | 83.17 | 4.52 | 95.04 | 97.04 | 96.74 | 96.8 | 96.41 | 0.92 |
| STAR-FC | 87.15 | 85.2 | 4.17 | 95.75 | 97.36 | 97.22 | 97.19 | 96.88 | 0.76 |
| OMHC | 88.56 | 86.64 | 3.79 | 95.04 | 97.65 | 97.36 | 97.47 | 97.1 | 0.81 |
| DISCLOSURE | 90.31 | 88.59 | 3.15 | 96.44 | 97.97 | 97.64 | 97.82 | 97.47 | 0.7 |
| (C2) BUPT-GlobalFace (2.2M) | | | | | | | | | |
| Clusformer | 87.18 | 85.14 | 4.16 | 95.51 | 97.39 | 97.3 | 97.18 | 96.8 | 0.87 |
| STAR-FC | 89.56 | 87.75 | 3.48 | 96.21 | 97.84 | 97.53 | 97.67 | 97.31 | 0.75 |
| OMHC | 90.44 | 88.64 | 3.02 | 96.44 | 97.98 | 97.47 | 97.66 | 97.39 | 0.67 |
| DISCLOSURE | 91.86 | 90.19 | 2.56 | 96.78 | 98.1 | 97.65 | 98.0 | 97.03 | 0.6 |
| (C3) BUPT-In-the-wild (3.4M) | | | | | | | | | |
| Clusformer | 93.24 | 91.88 | 2.14 | 97.24 | 98.47 | 98.24 | 98.42 | 98.09 | 0.58 |
| STAR-FC | 93.73 | 92.41 | 1.97 | 97.43 | 98.57 | 98.32 | 98.54 | 98.22 | 0.54 |
| OMHC | 93.93 | 92.63 | 1.9 | 97.51 | 98.61 | 98.36 | 98.58 | 98.27 | 0.52 |
| DISCLOSURE | 94.73 | 93.63 | 1.43 | 97.97 | 98.8 | 98.47 | 98.77 | 98.5 | 0.38 |

In addition, Applicants also show the detailed experiment results of clustering performance on different demographics in the table style. Table 1, Table 2, Table 3, Tables 4, 5, 6, and Tables 7, 8, 9 show the full results ($F_P$, $F_B$ and NMI) of methods' on BUPT-BalancedFace with respect to different demographics. It is noted that Table 1 and Table 3 share the same meaning of demographic, i.e., ethnicity, but the labels for ethnicity in 3 are inferred by a trained FairFace model. Both tables demonstrate superior performance compared to previous works.

TABLE 4

Comparison of fairness w.r.t the age of identity on BUPT-BalancedFace. The results are reported in $F_P$ metric.

| | $F_P$ | | | | | | | | | | |
|---|---|---|---|---|---|---|---|---|---|---|---|
| Method | 0-2 | 3-9 | 10-19 | 20-29 | 30-39 | 40-49 | 50-59 | 60-69 | 70+ | Mean | STD |
| (C1) BUPT-In-the-wild (485K) | | | | | | | | | | | |
| LTC | 62.5 | 68.41 | 75.46 | 77.19 | 77.32 | 75.79 | 75.82 | 74.06 | 68.57 | 72.79 | 5.12 |
| GCN-V | 67.12 | 73.3 | 79.59 | 81.45 | 81.62 | 79.82 | 79.82 | 78.17 | 72.75 | 77.07 | 4.93 |
| GCN-V/E | 70.75 | 77.23 | 82.93 | 84.83 | 84.9 | 83.0 | 82.83 | 81.31 | 75.88 | 80.41 | 4.79 |
| Clusformer | 73.76 | 80.48 | 85.48 | 87.41 | 87.48 | 85.41 | 85.15 | 83.78 | 78.55 | 83.06 | 4.59 |
| STAR-FC | 75.96 | 82.95 | 87.87 | 89.67 | 89.12 | 87.08 | 86.76 | 86.38 | 80.41 | 85.02 | 4.49 |
| OMHC | 77.95 | 84.67 | 89.22 | 90.97 | 90.78 | 88.75 | 88.13 | 86.85 | 82.17 | 86.61 | 4.31 |
| DISCLOSURE | 79.79 | 87.11 | 91.31 | 92.88 | 92.65 | 90.7 | 90.04 | 88.85 | 86.9 | 88.69 | 4.21 |
| (C2) BUPT-GlobalFace (2.2M) | | | | | | | | | | | |
| Clusformer | 76.09 | 82.94 | 87.66 | 89.52 | 89.35 | 87.3 | 86.8 | 85.52 | 80.52 | 85.08 | 4.46 |
| STAR-FC | 79.2 | 86.07 | 90.46 | 92.02 | 91.83 | 89.83 | 89.24 | 88.08 | 83.88 | 87.85 | 4.18 |
| OMHC | 79.75 | 87.33 | 91.12 | 92.7 | 92.58 | 90.57 | 90.02 | 88.99 | 84.68 | 88.64 | 4.19 |
| DISCLOSURE | 81.99 | 88.41 | 92.97 | 94.16 | 93.29 | 90.6 | 89.86 | 90.15 | 85.48 | 89.66 | 3.93 |
| (C3) BUPT-In-the-wild (3.4M) | | | | | | | | | | | |
| Clusformer | 84.5 | 90.13 | 93.76 | 94.54 | 94.48 | 93.15 | 92.71 | 92.66 | 89.67 | 91.73 | 3.21 |
| STAR-FC | 85.42 | 90.88 | 94.17 | 94.86 | 94.82 | 93.55 | 93.0 | 92.94 | 90.35 | 92.22 | 3.0 |
| OMHC | 85.88 | 91.15 | 94.32 | 95.0 | 94.97 | 93.7 | 93.08 | 93.09 | 90.58 | 92.42 | 2.9 |
| DISCLOSURE | 87.11 | 92.52 | 95.37 | 95.82 | 95.58 | 94.22 | 93.16 | 93.69 | 91.22 | 93.19 | 2.74 |

TABLE 5

Comparison of fairness w.r.t the age of identity on BUPT-BalancedFace. The results are reported in $F_B$ metric.

| | $F_B$ | | | | | | | | | | |
|---|---|---|---|---|---|---|---|---|---|---|---|
| Method | 0-2 | 3-9 | 10-19 | 20-29 | 30-89 | 40-49 | 50-59 | 60-69 | 70+ | Mean | STD |
| (C1) BUPT-In-the-wild (485K) | | | | | | | | | | | |
| LTC | 69.47 | 74.87 | 79.12 | 78.4 | 77.82 | 76.43 | 77.89 | 78.46 | 76.85 | 77.36 | 2.97 |
| GCN-V | 72.77 | 78.46 | 82.61 | 82.19 | 81.7 | 80.01 | 81.22 | 81.52 | 78.62 | 80.79 | 3.06 |

TABLE 5-continued

Comparison of fairness w.r.t the age of identity on BUPT-BalancedFace. The results are reported in $F_B$ metric.

| | $F_B$ | | | | | | | | | | |
|---|---|---|---|---|---|---|---|---|---|---|---|
| Method | 0-2 | 3-9 | 10-19 | 20-29 | 30-89 | 40-49 | 50-59 | 60-69 | 70+ | Mean | STD |
| GCN-V/E | 75.4 | 81.4 | 85.44 | 85.22 | 84.7 | 82.87 | 83.75 | 83.88 | 80.75 | 83.5 | 3.14 |
| Clusformer | 77.6 | 83.88 | 87.56 | 87.52 | 87.01 | 85.07 | 85.65 | 85.74 | 82.58 | 85.63 | 3.15 |
| STAR-FC | 79.56 | 85.94 | 89.58 | 89.34 | 88.55 | 87.0 | 86.9 | 87.13 | 84.22 | 87.83 | 3.09 |
| OMHC | 80.69 | 87.19 | 90.69 | 90.71 | 90.03 | 88.11 | 88.26 | 88.26 | 85.32 | 88.57 | 3.15 |
| DISCLOSURE | 82.43 | 89.14 | 92.42 | 92.45 | 91.7 | 89.83 | 89.86 | 89.82 | 87.21 | 90.3 | 3.12 |
| (C2) BUPT-GlobalFace (2.2M) | | | | | | | | | | | |
| Clusformer | 79.31 | 85.82 | 89.38 | 89.39 | 88.71 | 86.79 | 87.12 | 87.16 | 84.05 | 87.3 | 3.17 |
| STAR-FC | 81.66 | 88.28 | 91.7 | 91.67 | 90.98 | 89.09 | 89.18 | 89.22 | 86.48 | 89.58 | 3.13 |
| OMHC | 82.41 | 89.19 | 92.32 | 92.37 | 91.68 | 89.62 | 89.78 | 89.95 | 87.23 | 90.27 | 3.1 |
| DISCLOSURE | 84.75 | 90.72 | 93.82 | 93.78 | 92.97 | 91.14 | 90.97 | 91.3 | 88.75 | 90.91 | 2.82 |
| (C3) BUPT-In-the-wild (3.4M) | | | | | | | | | | | |
| Clusformer | 86.05 | 91.58 | 94.38 | 94.32 | 93.88 | 92.63 | 92.67 | 93.13 | 90.82 | 92.16 | 2.58 |
| STAR-FC | 86.92 | 92.23 | 94.81 | 94.71 | 94.29 | 93.12 | 93.06 | 93.45 | 91.44 | 92.67 | 2.43 |
| OMHC | 87.31 | 92.48 | 94.96 | 94.85 | 94.47 | 93.33 | 93.22 | 93.62 | 91.67 | 92.88 | 2.35 |
| DISCLOSURE | 88.98 | 93.94 | 95.91 | 95.72 | 95.2 | 94.21 | 93.97 | 94.33 | 92.69 | 93.88 | 2.09 |

TABLE 6

Comparison of fairness w.r.t the age of identity on BUPTBalancedFace. The results are reported in NMI metric.

| | NMI | | | | | | | | | | |
|---|---|---|---|---|---|---|---|---|---|---|---|
| Method | 0-2 | 3-9 | 10-19 | 20-29 | 30-39 | 40-49 | 50-59 | 60-69 | 70+ | Mean | STD |
| (C1) BUPT-In-the-wild (485K) | | | | | | | | | | | |
| LTC | 95.13 | 95.49 | 95.96 | 95.68 | 95.71 | 95.68 | 95.85 | 95.88 | 95.61 | 95.67 | 0.25 |
| GCN-V | 95.6 | 96.09 | 96.61 | 96.42 | 96.44 | 96.3 | 96.44 | 96.43 | 96.08 | 96.27 | 0.3 |
| GCN-V/E | 95.97 | 96.58 | 97.14 | 97.02 | 97.0 | 96.8 | 96.89 | 96.86 | 96.44 | 96.74 | 0.36 |
| Clusformer | 96.29 | 97.0 | 97.55 | 97.48 | 97.44 | 97.19 | 97.23 | 97.19 | 96.75 | 97.12 | 0.4 |
| STAR-FC | 96.41 | 97.25 | 97.91 | 97.63 | 97.94 | 97.31 | 97.52 | 97.25 | 96.98 | 97.36 | 0.48 |
| OMHC | 96.72 | 97.58 | 98.15 | 98.12 | 98.01 | 97.74 | 97.7 | 97.67 | 97.22 | 97.66 | 0.46 |
| DISCLOSURE | 96.9 | 97.92 | 98.49 | 98.46 | 98.32 | 98.03 | 97.98 | 97.95 | 97.54 | 97.95 | 0.5 |
| (C2) BUPT-GlobalFace (2.2M) | | | | | | | | | | | |
| Clusformer | 96.53 | 97.34 | 97.9 | 97.85 | 97.76 | 97.5 | 97.5 | 97.46 | 97.0 | 97.43 | 0.44 |
| STAR-FC | 96.84 | 97.78 | 98.35 | 98.31 | 98.19 | 97.91 | 97.87 | 97.84 | 97.42 | 97.83 | 0.47 |
| OMHC | 96.7 | 97.83 | 98.25 | 98.66 | 98.17 | 98.0 | 97.8 | 97.79 | 97.59 | 97.86 | 0.54 |
| DISCLOSURE | 97.72 | 98.11 | 98.73 | 98.66 | 98.47 | 98.13 | 98.06 | 98.15 | 97.65 | 98.19 | 0.38 |
| (C3) BUPT-In-the-wild (3.4M) | | | | | | | | | | | |
| Clusformer | 97.57 | 98.33 | 98.78 | 98.77 | 98.71 | 98.52 | 98.51 | 98.58 | 98.21 | 98.44 | 0.38 |
| STAR-FC | 97.71 | 98.45 | 98.87 | 98.85 | 98.8 | 98.62 | 98.58 | 98.64 | 98.32 | 98.54 | 0.36 |
| OMHC | 97.77 | 98.5 | 98.9 | 98.88 | 98.84 | 98.66 | 98.61 | 98.67 | 98.36 | 98.58 | 0.35 |
| DISCLOSURE | 98.03 | 98.8 | 99.12 | 99.08 | 98.99 | 98.83 | 98.74 | 98.81 | 98.53 | 98.77 | 0.33 |

TABLE 7

Comparison of fairness w.r.t the pseudo race (7 classes) of identity on BUPT-BalancedFace. The results are reported in $F_P$ metric.

| | $F_P$ | | | | | | | | |
|---|---|---|---|---|---|---|---|---|---|
| Method | EA | SA | LH | B | I | ME | W | Mean | STD |
| (C1) BUPT-In-the-wild (485K) | | | | | | | | | |
| LTC | 61.66 | 63.5 | 74.39 | 78.32 | 82.12 | 74.9 | 78.86 | 73.39 | 7.84 |
| GCN-V | 67.2 | 68.75 | 78.75 | 82.66 | 85.2 | 79.41 | 82.88 | 77.84 | 7.09 |
| GCN-V/E | 71.8 | 72.97 | 82.15 | 85.78 | 87.87 | 82.89 | 86.16 | 81.37 | 6.45 |
| Clusformer | 75.67 | 76.41 | 84.81 | 88.15 | 89.78 | 85.57 | 88.44 | 84.12 | 5.78 |

TABLE 7-continued

Comparison of fairness w.r.t the pseudo race (7 classes) of identity on BUPT-BalancedFace. The results are reported in $F_P$ metric.

| | $F_P$ | | | | | | | | |
|---|---|---|---|---|---|---|---|---|---|
| Method | EA | SA | LH | B | I | ME | W | Mean | STD |
| STAR-FC | 78.8 | 78.96 | 86.93 | 90.01 | 91.36 | 87.72 | 90.28 | 86.29 | 5.29 |
| OMHC | 81.11 | 81.29 | 88.36 | 91.26 | 92.47 | 89.15 | 91.43 | 87.87 | 4.76 |
| DISCLOSURE | 86.62 | 86.49 | 90.24 | 92.9 | 93.94 | 91.12 | 93.18 | 90.07 | 3.97 |
| (C2) BUPT-GlobalFace (2.2M) | | | | | | | | | |
| Clusformer | 78.74 | 79.1 | 86.85 | 89.93 | 91.41 | 87.61 | 90.12 | 86.25 | 5.24 |
| STAR-FC | 83.01 | 83.05 | 89.46 | 92.19 | 93.33 | 90.28 | 92.4 | 89.1 | 4.35 |
| OMHC | 84.67 | 84.55 | 90.41 | 92.65 | 93.79 | 91.3 | 93.31 | 90.1 | 3.92 |
| DISCLOSURE | 88.9 | 88.49 | 89.57 | 93.4 | 94.68 | 91.24 | 94.62 | 91.0 | 3.36 |
| (C3) BUPT-In-the-wild (3.4M) | | | | | | | | | |
| Clusformer | 90.13 | 89.08 | 92.54 | 94.84 | 95.63 | 93.49 | 95.54 | 93.04 | 2.61 |
| STAR-FC | 90.77 | 89.87 | 92.91 | 95.13 | 95.86 | 93.91 | 95.86 | 93.47 | 2.41 |
| OMHC | 91.08 | 90.14 | 93.08 | 95.21 | 95.95 | 94.06 | 95.97 | 93.64 | 2.33 |
| DISCLOSURE | 93.81 | 93.0 | 93.53 | 95.49 | 96.42 | 94.61 | 96.39 | 94.44 | 1.79 |

EA: East Asian, SA: Southeast Asian, LH: Latino Hispanic, MD: Middle Eastern.

TABLE 8

Comparison of fairness w.r.t the pseudo race (7 classes) of identity on BUPT-BalancedFace. The results are reported in $F_B$ metric.

| | $F_B$ | | | | | | | | |
|---|---|---|---|---|---|---|---|---|---|
| Method | EA | SA | LH | B | I | ME | W | Mean | STD |
| (C1) BUPT-In-the-wild (485K) | | | | | | | | | |
| LTC | 67.86 | 67.93 | 73.57 | 78.79 | 82.89 | 75.78 | 79.19 | 75.14 | 5.74 |
| GCN-V | 72.42 | 72.38 | 77.54 | 82.58 | 85.66 | 79.64 | 82.85 | 79.01 | 5.19 |
| GCN-V/E | 76.22 | 75.96 | 80.66 | 85.38 | 88.02 | 82.62 | 85.8 | 82.09 | 4.73 |
| Clusformer | 79.32 | 78.83 | 83.08 | 87.57 | 89.71 | 84.96 | 87.87 | 84.48 | 4.26 |
| STAR-FC | 81.89 | 80.92 | 84.93 | 89.35 | 91.28 | 86.92 | 89.37 | 86.38 | 3.96 |
| OMHC | 83.68 | 82.99 | 86.36 | 90.35 | 92.09 | 88.17 | 90.73 | 87.77 | 3.55 |
| DISCLOSURE | 86.54 | 85.61 | 88.08 | 91.82 | 93.4 | 89.93 | 92.36 | 89.68 | 3.02 |
| (C2) BUPT-GlobalFace (2.2M) | | | | | | | | | |
| Clusformer | 81.74 | 81.14 | 84.96 | 89.16 | 91.12 | 86.8 | 89.48 | 86.34 | 3.89 |
| STAR-FC | 85.29 | 84.43 | 87.34 | 91.2 | 92.86 | 89.17 | 91.66 | 88.85 | 3.27 |
| OMHC | 86.41 | 85.64 | 88.05 | 91.94 | 93.15 | 89.68 | 92.13 | 89.57 | 2.96 |
| DISCLOSURE | 89.1 | 87.8 | 89.41 | 92.84 | 94.26 | 91.36 | 93.85 | 91.23 | 2.53 |
| (C3) BUPT-In-the-wild (3.4M) | | | | | | | | | |
| Clusformer | 90.78 | 89.8 | 91.08 | 94.19 | 95.28 | 92.66 | 94.94 | 92.68 | 2.18 |
| STAR-FC | 91.43 | 90.54 | 91.61 | 94.55 | 95.56 | 93.22 | 95.33 | 93.18 | 2.03 |
| OMHC | 91.74 | 90.82 | 91.84 | 94.65 | 95.67 | 93.44 | 95.48 | 93.38 | 1.95 |
| DISCLOSURE | 93.39 | 92.38 | 92.78 | 95.16 | 96.22 | 94.4 | 96.11 | 94.35 | 1.56 |

EA: East Asian, SA: Southeast Asian, LH: Latino Hispanic, MD: Middle Eastern.

Ablation Studies. Here, Applicants analyze the roles of C-ATT, $L^{FMI}$ and $L^{fair}$ on their contributions (see Table 11) and experiment Intraformer with different decomposition settings (see Table 10). Applicants train the model on BUPT-In-the-wild (3.4M) and evaluate on the ethnicity aspect of BUPT-BalancedFace.

The roles of C-ATT, $L^{FMI}$ and $L^{fair}$. Applicants configure a baseline Intraformer with 4 sub-clusters using neither C-ATT nor $L^{FMI}$ nor $L^{fair}$. It is not surprising that Applicants' baseline achieves an FP of 91.21% and std of 3.89% which is much lower than previous methods, i.e. Clusformer, STAR-FC and OMHC. With $L^{FMI}$ loss, an improvement of 0.65% for $F_P$ and 0.3% for std is achieved. In the third experiment, $L^{fair}$ is employed to train the model concurrently, and both $F_P$ and std values are improved by 0.8% and 0.5% respectively. When C-ATT is enabled to further explore correlations between centroid to all samples, and encourage hard clusters toward the fairness point, the performance surpasses the state-of-the-art method.

Stabilization of Intraformer. There are several ways to decompose a cluster in the dataset into smaller sub-clusters. Table 11 shows the performance of Intraformer in different settings. It is important to note that the performance of Intraformer does not fluctuate much across different settings. The average $F_P$ score is 93.28%±2.47%. These results emphasize the stabilization and robustness of Applicants' approach.

TABLE 9

Comparison of fairness w.r.t the pseudo race (7 classes) of identity on BUPT-BalancedFace. The results are reported in NMI metric.

| Method | NMI | | | | | | | | |
|---|---|---|---|---|---|---|---|---|---|
| | EA | SA | LH | B | I | ME | W | Mean | STD |
| (C1) BUPT-In-the-wild (485K) | | | | | | | | | |
| LTC | 93.56 | 93.91 | 95.08 | 95.41 | 96.45 | 95.48 | 95.5 | 95.05 | 1.0 |
| GCN-V | 94.4 | 94.67 | 95.73 | 96.2 | 97.03 | 96.17 | 96.27 | 95.78 | 0.94 |
| GCN-V/E | 95.11 | 95.29 | 96.3 | 96.78 | 97.51 | 96.71 | 96.88 | 96.37 | 0.88 |
| Clusformer | 95.71 | 95.81 | 96.73 | 97.23 | 97.86 | 97.13 | 97.34 | 96.83 | 0.8 |
| STAR-FC | 96.02 | 96.22 | 96.97 | 97.38 | 98.1 | 97.29 | 97.43 | 97.06 | 0.73 |
| OMHC | 96.55 | 96.56 | 97.83 | 97.81 | 98.34 | 97.71 | 97.95 | 97.46 | 0.69 |
| DISCLOSURE | 97.11 | 97.02 | 97.61 | 98.12 | 98.6 | 98.03 | 98.3 | 97.83 | 0.6 |
| (C2) BUPT-GlobalFace (2.2M) | | | | | | | | | |
| Clusformer | 96.17 | 96.23 | 97.07 | 97.56 | 98.14 | 97.47 | 97.68 | 97.19 | 0.75 |
| STAR-FC | 96.87 | 96.82 | 97.5 | 97.99 | 98.49 | 97.9 | 98.14 | 97.67 | 0.64 |
| OMHC | 97.03 | 97.16 | 97.45 | 97.89 | 98.62 | 98.16 | 98.53 | 97.84 | 0.64 |
| DISCLOSURE | 97.56 | 97.31 | 97.63 | 98.23 | 98.73 | 98.16 | 98.54 | 98.02 | 0.53 |
| (C3) BUPT-In-the-wild (3.4M) | | | | | | | | | |
| Clusformer | 97.78 | 97.72 | 98.17 | 98.63 | 98.96 | 98.55 | 98.82 | 98.38 | 0.49 |
| STAR-FC | 97.93 | 97.87 | 98.28 | 98.71 | 99.02 | 98.65 | 98.91 | 98.48 | 0.46 |
| OMHC | 98.0 | 97.94 | 98.32 | 98.73 | 99.05 | 98.69 | 98.95 | 98.53 | 0.44 |
| DISCLOSURE | 98.44 | 98.31 | 98.5 | 98.84 | 99.17 | 98.87 | 99.09 | 98.75 | 0.33 |

EA: East Asian, SA: Southeast Asian, LH: Latino Hispanic, MD: Middle Eastern.

TABLE 10

Effects of Different settings on numbers of sub-clusters.

| k | Asian | African | Caucasian | Indian | $F_P$ | std |
|---|---|---|---|---|---|---|
| 4 | 89.65 | 94.04 | 95.15 | 94.28 | 93.28 | 2.47 |
| 5 | 89.13 | 94.26 | 95.14 | 94.07 | 93.15 | 2.72 |
| 8 | 88.83 | 94.21 | 95.06 | 93.94 | 93.01 | 2.83 |
| 10 | 88.52 | 94.12 | 94.95 | 93.79 | 92.85 | 2.92 |
| 16 | 87.94 | 93.96 | 94.72 | 93.44 | 92.52 | 3.09 |

TABLE 11

Ablation Study on C-ATT, $L^{fair}$ and $L^{FMI}$

| C-ATT | $\mathcal{L}^{fair}$ | $\mathcal{L}^{FMI}$ | Asian | African | Caucasian | Indian | $F_P$ | std |
|---|---|---|---|---|---|---|---|---|
| X | X | X | 85.46 | 93.29 | 93.83 | 92.27 | 91.21 | 3.89 |
| X | X | ✓ | 86.68 | 93.64 | 94.29 | 92.81 | 91.86 | 3.50 |
| X | ✓ | ✓ | 88.23 | 94.05 | 94.84 | 93.63 | 92.69 | 3.01 |
| ✓ | ✓ | ✓ | 89.65 | 94.04 | 95.15 | 94.28 | 93.28 | 2.47 |

Example 1.7 Conclusions and Discussions

Unlike a few concurrent research on the fairness of computer vision, Applicants study how to address the unfair facial clustering problem. Applicants introduce cluster purity as an indicator of demographic bias. Secondly, Applicants propose a novel loss to enforce the consistency of purity between clusters of different groups; thus, fairness can be achieved. Finally, a novel framework for visual clustering was presented to strengthen the hard clusters, which usually come from the minor/biased group. This framework contributes not only to fairness but also to clustering performance overall.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

The invention claimed is:

1. A method for evaluating demographic bias of images in a model comprising multiple clusters of images, the method comprising:

determining demographic bias of the images in each of the multiple clusters of the model via a cluster purity evaluation module;

encouraging a demographic fairness consistency for each of the multiple clusters via a loss function module to maintain fairness of the model, wherein the loss function module comprises a Fowlkes-Mallows-based index;

identifying, via a cross-attention module, correlations between each of the multiple clusters; and strengthening, via the cross-attention module, samples to have a stronger relationship with a centroid of each of the multiple clusters.

2. The method of claim 1, wherein the determining comprises calculating the ratio of positive samples within each of the multiple clusters to their correlation degree.

3. The method of claim 1, wherein the determined demographic bias is selected from the group consisting of biases based, at least in part, on gender, ethnicity, race, age, or combinations thereof.

4. The method of claim 1, wherein the images comprise unlabeled facial images of a plurality of subjects.

5. The method of claim 1, wherein the model comprises a deep clustering model comprising the multiple clusters of images.

6. The method of claim 1, wherein the encouraging the demographic fairness comprises improving purity, via the loss function module, of the multiple clusters.

7. The method of claim 6, wherein the purity comprises an indicator of demographic bias between clusters of different groups.

8. A system comprising a processor coupled to a memory, wherein the processor is operable to implement a method comprising:

determining demographic bias of the images in each of the multiple clusters of the model via a cluster purity evaluation module;

encouraging a demographic fairness consistency for each of the multiple clusters via a loss function module to maintain fairness of the model, wherein the loss function module comprises a Fowlkes-Mallows-based index;

identifying, via a cross-attention module, correlations between each of the multiple clusters; and strengthening, via the cross-attention module, samples to have a stronger relationship with a centroid of each of the multiple clusters.

9. The system of claim 8, wherein the determining comprises calculating the ratio of positive samples within each of the multiple clusters to their correlation degree.

10. The system of claim 8, wherein the determined demographic bias is selected from the group consisting of biases based, at least in part, on gender, ethnicity, race, age, or combinations thereof.

11. The system of claim 8, wherein the images comprise unlabeled facial images of a plurality of subjects.

12. The system of claim 8, wherein the model comprises a deep clustering model comprising the multiple clusters of images.

13. The system of claim 8, wherein the encouraging the demographic fairness comprises improving purity, via the loss function module, of the multiple clusters.

14. The system of claim 13, wherein the purity comprises an indicator of demographic bias between clusters of different groups.

15. A computer-program product comprising a non-transitory computer-usable medium having computer-readable program code embodied therein, the computer-readable program code adapted to be executed to implement a method comprising:

determining demographic bias of the images in each of the multiple clusters of the model via a cluster purity evaluation module;

encouraging a demographic fairness consistency for each of the multiple clusters via a loss function module to maintain fairness of the model, wherein the loss function module comprises a Fowlkes-Mallows-based index;

identifying, via a cross-attention module, correlations between each of the multiple clusters; and strengthening, via the cross-attention module, samples to have a stronger relationship with a centroid of each of the multiple clusters.

16. The computer-program product of claim 15, wherein the determining comprises calculating the ratio of positive samples within each of the multiple clusters to their correlation degree.

17. The computer-program product of claim 16, further comprising using the calculation as an indication of the demographic bias in the model.

* * * * *